US012790891B2

(12) United States Patent
Chen et al.

(10) Patent No.: US 12,790,891 B2
(45) Date of Patent: Nov. 10, 2026

(54) WINDOW COVERING AND WINDOW COVERING OPERATION MECHANISM THEREOF

(71) Applicant: Nien Made Enterprise Co., Ltd., Taichung City (TW)

(72) Inventors: Lin Chen, Taichung City (TW); Jingjing Yang, Taichung City (TW)

(73) Assignee: Nien Made Enterprise Co., Ltd., Taichung City (TW)

( * ) Notice: Subject to any disclaimer, the term of this patent is extended or adjusted under 35 U.S.C. 154(b) by 116 days.

(21) Appl. No.: 18/973,097

(22) Filed: Dec. 8, 2024

(65) Prior Publication Data

US 2025/0250851 A1 Aug. 7, 2025

(30) Foreign Application Priority Data

Feb. 7, 2024 (CN) ......................... 202420288402.5

(51) Int. Cl.

*E06B 9/42* (2006.01)
*E06B 9/76* (2006.01)
*E06B 9/78* (2006.01)

(52) U.S. Cl.

CPC .................. *E06B 9/42* (2013.01); *E06B 9/76* (2013.01); *E06B 9/78* (2013.01)

(58) Field of Classification Search

CPC ..... E06B 9/40; E06B 9/42; E06B 9/56; E06B 9/60; E06B 9/76; E06B 9/78; E06B 2009/785

See application file for complete search history.

(56) References Cited

U.S. PATENT DOCUMENTS 7,128,126 B2 * 10/2006 Smith ..................... E06B 9/262 160/84.05
7,578,334 B2 * 8/2009 Smith ....................... E06B 9/42 160/84.05
7,665,507 B2 * 2/2010 Naoki ....................... E06B 9/78 160/170

(Continued)

FOREIGN PATENT DOCUMENTS

DE 10 2006 060 973 A1 7/2008
JP 2013-520592 A 6/2013

(Continued)

*Primary Examiner* — Johnnie A. Shablack
(74) *Attorney, Agent, or Firm* — Winston Hsu

(57) ABSTRACT

A window covering includes a roller and a window covering operation mechanism. The window covering operation mechanism includes a driving connector fixed to a roller, a base, a torsional direction switching mechanism, a driving member, a driven member, a reversal cord, and a lift cord. When the reversal cord is dragged, the driving member is driven to rotate, whereby plural bumps of the driving member are guided by plural guiding rails of the base, making the driving member drive the driven member to move together while rotating. When the lift cord is dragged, the driven member is driven to rotate with respect to the driving member, driving the driving connector directly or through the torsional direction switching mechanism according to the position of the driven member for outputting a torsional force in the forward or reverse direction to the roller, thereby controlling retraction or extension of the window covering.

19 Claims, 24 Drawing Sheets

(56) References Cited

U.S. PATENT DOCUMENTS

| | | | | |
|---|---|---|---|---|
| 8,191,605 | B2 * | 6/2012 | Kwak | E06B 9/42 160/319 |
| 8,356,653 | B2 * | 1/2013 | Fu-Lai | E06B 9/322 160/84.05 |
| 8,844,605 | B2 * | 9/2014 | Ng | E06B 9/78 192/81 C |
| 9,187,951 | B2 * | 11/2015 | Yu | E06B 9/90 |
| 9,284,774 | B2 * | 3/2016 | Yu | E06B 9/322 |
| 9,657,517 | B2 | 5/2017 | Huang | |
| 9,765,864 | B2 * | 9/2017 | Yu | E06B 9/78 |
| 10,012,020 | B2 * | 7/2018 | Li | F16D 43/02 |
| 10,407,983 | B2 * | 9/2019 | Holt | E06B 9/90 |
| 11,293,220 | B2 * | 4/2022 | Cheng | E06B 9/322 |
| 11,448,009 | B2 * | 9/2022 | Otsuka | E06B 9/262 |
| 11,492,845 | B2 * | 11/2022 | Cheng | E06B 9/262 |
| 11,859,447 | B2 * | 1/2024 | Brown, II | E06B 9/06 |
| 11,866,994 | B2 * | 1/2024 | Francoeur | E06B 9/78 |
| 11,927,058 | B2 * | 3/2024 | Lee | E06B 9/34 |
| 12,129,713 | B2 * | 10/2024 | Kim | E06B 9/42 |
| 12,320,196 | B2 * | 6/2025 | Wang | E06B 9/78 |
| 12,428,907 | B1 * | 9/2025 | Lu | E06B 9/78 |
| 12,503,913 | B2 * | 12/2025 | Lee | E06B 9/68 |
| 2004/0226663 | A1 | 11/2004 | Smith | |
| 2014/0216668 | A1 * | 8/2014 | Kim | E06B 9/42 160/322 |
| 2016/0281423 | A1 * | 9/2016 | Kao | E06B 9/42 |
| 2021/0087879 | A1 | 3/2021 | Cheng | |
| 2024/0328253 | A1 * | 10/2024 | Wang | E06B 9/42 |
| 2026/0110214 | A1 * | 4/2026 | Chen | E06B 9/322 |

FOREIGN PATENT DOCUMENTS

| | | |
|---|---|---|
| JP | 2018-71198 | 5/2018 |
| JP | 2018-71347 | 5/2018 |

* cited by examiner

WINDOW COVERING AND WINDOW COVERING OPERATION MECHANISM THEREOF

BACKGROUND OF THE DISCLOSURE

1. Field of the Disclosure

The present disclosure relates to a window covering, and more particularly relates to a window covering operation mechanism of the window covering with a simple and compact structure providing easy and error-proof operation and ensuring safety in use.

2. Description of the Prior Art

Window coverings are generally applied to the openings of architectures, such as windows or doors, for adjusting light transmittance or improving privacy. Depending on an operation manner, a typical window covering with a light-shielding portion vertically adjustable in size can be a corded type or a cordless type. In general, the corded type of window covering is operated by a continuous cord loop. The user can raise or lower the light-shielding portion of the window covering by pulling down the two sides of the cord loop, respectively. However, children may accidentally thread their heads through the cord loop, causing the cord loop to entangle around their necks. To prevent danger to children, some other corded-type window coverings on the market replace their cord loops by a single dangling cord. The user can switch the control mode of the window covering between raising and lowering the light-shielding portion by either rotating a curtain controller installed on the upper rail or pulling the dangling cord at a specific angle.

However, the user shorter in height cannot easily touch the curtain controller installed on the headrail, because the headrail of the window covering is usually positioned at a certain height. Moreover, the mode switching mechanism installed in the headrail to which the curtain controller links for taking effects generally has big volume, which limits design of the entire appearance of the window covering. On the other hand, for the window coverings operated by pulling a dangling cord, the functions are performed according to a pulling angle of the dangling cord (e.g., diagonally pulling the dangling cord is to switch the control mode, and straightly pulling the dangling cord is to raise or lower the light-shielding portion according to the current control mode), resulting in difficulty and complexity in operation. If the user fails to grasp a precise angle for pulling the dangling cord, errors in operation are likely to occur. More importantly, as long as a certain length of the dangling cord protrudes beyond the headrail, even a single dangling cord could still pose a risk of accidental entanglement around a child's neck.

SUMMARY OF THE DISCLOSURE

In light of the above reasons, one aspect of the present disclosure is to provide a window covering and a window covering operation mechanism thereof, in which the window covering operation mechanism provides users with two separated operating objects for performing different functions, thereby avoiding confusion or fault in operation and solving the problem of the corded window coverings in the art that the operation is complicated and errors easily occur as utilizing one single dangling cord to provide multiple operation methods at the same time. Meanwhile, the window covering and the window covering operation mechanism of the present disclosure also solve the problem that the curtain controller mounted on or nearby the headrail is inaccessible and the mode switching mechanism connected thereto has large volume, and the problem that the safety risk of the continuous cord loop for child.

The window covering of the present disclosure includes a roller and the window covering operation mechanism. The window covering operation mechanism includes a driving connector, a base, a torsional direction switching mechanism, a driven member, a driving member, a first transmission member, and a second transmission member. The driving connector is fixedly connected to one end of the roller, so that the roller is concurrently rotatable with the driving connector. The base includes plural first guiding structures, each of which is preferably a guiding rail. Preferably, the first transmission member is a reversal cord, and the second transmission member is a lift cord.

The torsional direction switching mechanism includes an input portion and an output portion, which is connected to the driving connector in a concurrently rotatable manner. When the input portion is driven to rotate, the output portion rotates in the opposite direction to the input portion, and drives the driving connector to rotate in the same direction as the output portion itself. The driving member includes an annular body and plural second guiding structures. Preferably, each of the second guiding structures is a bump. The annular body is disposed around the driven member and connected to the driven member in the axial direction of the roller, so that the driven member can move together with the driving member along the axial direction of the roller. Moreover, the annular body and the driven member can rotate with respect to each other around the axial direction of the roller when being subjected to force individually.

The second guiding e formed on an outer peripheral surface of the annular body and engaged with the first guiding structures, respectively. Each of the second guiding structures is movable with respect to the corresponding first guiding structure between a first position and a second position upon the rotation of the annular body, wherein the second position is farther away from the roller than the first position. When each of the second guiding structures is moved from the first position to the second position with respect to the corresponding first guiding structure upon the rotation of the driving member, the driving member is concurrently guided to move along the axial direction of the roller, from a third position to a fourth position, causing the driven member to move until the driven member is connected to the input portion of the torsional direction switching mechanism. The fourth position is farther away from the roller than the third position. Oppositely, when each of the second guiding structures is moved from the second position to the first position with respect to the corresponding first guiding structure upon the rotation of the driving member, the driving member is concurrently guided to move along the axial direction of the roller, from the fourth position to the third position, causing the driven member to move until the driven member is connected to the driving connector.

The first transmission member has an end connected to the driving member, and the other end extending out from the base for driving the driving member to rotate when being subjected to force. Once the driving member rotates, each of the second guiding structures moves from one of the first position and the second position to the other one of the first position and the second position with respect to the corresponding first guiding structure. Meanwhile, the motion of the second guiding structures guides the driving member itself to move along the axial direction of the roller concurrently. The second transmission member has an end connected to the driven member, and the other end extending out from the base for driving the driven member to rotate when being subjected to force. When the driving member is positioned at the third position and the driven member is rotated, the driven member drives the driving connector connected thereto to rotate, thereby outputting a forward torsional force to the roller. Oppositely, when the driving member is positioned at the fourth position and the driven member is rotated, the driven member drives the input portion of the torsional direction switching mechanism connected thereto to rotate, causing the output portion of the torsional direction switching mechanism to rotate in the opposite direction to the input portion, thereby outputting a reverse torsional force to the roller through the driving connector.

In another embodiment, each of the first guiding structure is a bump, and each of the second guiding structure is a guiding rail.

In one embodiment of the present disclosure, the window covering operation mechanism further includes a locking mechanism. The locking mechanism is disposed in the base for positioning the driving member at one of the third position and the fourth position. The locking mechanism includes a moving member, a locking stick, and a restoring member. The moving member has a connecting end, which is connected to the driving member, and a moving end having a cycling groove formed thereon. When the end of the first transmission member extending out from the base is subjected to force and thereby drives the driving member to rotate, the driving member drives the moving member to move. At this moment, the moving end of the moving member moves roughly in a first direction, whereby a relative movement of the locking stick with respect to the cycling groove occurs. The locking stick has one end fixed on the base and the other end extending into the cycling groove. The restoring member is disposed between an obstructing structure of the base and the moving member for providing the moving member with an elastic force opposite to the first direction. After the end of the first transmission member extending out from the base has driven the driving member to rotate as being subjected to a force, and subsequently stops being subjected to that force, the moving end of the moving member moves roughly in a direction opposite to the first direction under the action of the elastic force until the cycling groove is blocked by the locking stick. As the moving end stops moving, the moving member is in the stationary state and the locking stick is positioned at one of a forward position and a reverse position within the cycling groove. When the locking stick is positioned at the forward position in the cycling groove, the driving member is positioned at the third position. When the locking stick is positioned at the reverse position in the cycling groove, the driving member is positioned at the fourth position.

In another embodiment of the present disclosure, the locking mechanism includes a moving member, a grooved body, a locking stick, and a restoring member. The moving member has a connecting end, which is connected to the driving member, and a moving end opposite to the connecting end. The grooved body is fixed in the base and having a cycling groove formed thereon. The locking stick is disposed on the moving end of the moving member, and extends from the moving end into the cycling groove. When the end of the first transmission member extending out from the base is subjected to force and thereby drives the driving member to rotate, the driving member drives the moving member to move. At this moment, the moving end of the moving member moves roughly in a first direction, whereby a relative movement of the locking stick with respect to the cycling groove occurs. After the end of the first transmission member extending out from the base has driven the driving member to rotate as being subjected to a force, and subsequently stops being subjected to that force, the moving end of the moving member moves roughly in the direction opposite to the first direction under the action of the elastic force until the locking stick is blocked by the cycling groove. As the moving end stops moving, the moving member is in the stationary state and the locking stick is positioned at either the forward position or the reverse position within the cycling groove. When the locking stick is positioned at the forward position in the cycling groove, the driving member is positioned at the third position. When the locking stick is positioned at the reverse position in the cycling groove, the driving member is positioned at the fourth position.

Preferably, the bottom of the cycling groove has two stepped structures. In a direction of the relative movement of the locking stick with respect to the cycling groove, the two stepped structures are located in a path directed from the forward position to the reverse position and a path directed from the reverse position to the forward position, respectively, and transition from shallow to deep, thereby facilitating the locking stick to be switched smoothly between the forward position and the reverse position in response to the relative movement of the locking stick with respect to the cycling groove.

Preferably, the outer peripheral surface of the annular body of the driving member has a toothed portion, and the moving member includes a rack. The connecting end of the moving member is located on the rack, and connected to the toothed portion in an engaging manner.

Preferably, the moving member includes a blocking flange located between the connecting end and the moving end of the moving member, and the restoring member is disposed between the obstructing structure of the base and the blocking flange of the moving member. When the moving end of the moving member moves roughly in the first direction, a distance between the blocking flange and the obstructing structure is changed, such that the restoring member undergoes elastic deformation In one embodiment, the window covering operation mechanism further includes a control pull rod. The control pull rod includes a fixed shaft, a first shaft, and a second shaft. The fixed shaft has a first end and a second end opposite to the first end, in which the first end is connected to the base in a manner that the first end is pivotally swingable or rotatable with respect to the base. The first shaft is nested on the second end of the fixed shaft, and is retractable along an axial direction of the control pull rod with respect to the fixed shaft. In a similar manner, the second shaft is nested on the first shaft, and is retractable along the axial direction of the control pull rod with respect to the first shaft. The end of the first transmission member extending out from the base stretches into the control pull rod and is fixed to the first shaft. When the first shaft is protruded out with respect to the fixed shaft, the first shaft drives the driving member to rotate through the first transmission member. On the other hand, the end of the second transmission member extending out from the base stretches into the control pull rod and is fixed to the second shaft. When the second shaft is protruded out with respect to the first shaft, the second shaft drives the driven member to rotate through the second transmission member.

Preferably, the control pull rod further includes an elastic separator. The two ends of the elastic separator abut against a shaft limiting structure of the first shaft and the end surface on one end of the second shaft that is nested on the first shaft, respectively. Thus, the elastic separator keeps a non-overlapping section of the first shaft from overlapping with the second shaft, thereby ensuring that the first shaft is always prepared for being operated solely and avoiding the situation that in which the first shaft and the second shaft were synchronously pulled downward. The length of the non-overlapping section is longer than the length of the elastic separator while the elastic separator is completely compressed.

In one embodiment, the window covering operation mechanism further includes a rewinding unit. The rewinding unit includes an external toothed ring, a spring storage wheel, and a coil spring. The external toothed ring is connected to the driven member in a concurrently rotatable manner as the driven member is also allowed to move with respect to the external toothed ring along the axial direction of the roller. The spring storage wheel is connected to the external toothed ring and rotatably sleeved on a fixing post of the base. The coil spring has one end fixed on the fixing post of the base and the other end fixed on the spring storage wheel. The coil spring is generally wound around the fixing post of the base, being contracted or released correspondingly to different rotating directions of the spring storage wheel. When the second transmission member is subjected to force and thereby drives the driven member to rotate, the external toothed ring is driven by the driven member to rotate concurrently, driving the spring storage wheel to rotate in an accumulating direction and causing the coil spring to be released gradually. At this time, if the second transmission member stops being subjected to force, the spring storage wheel turns to rotate in an energy-releasing direction opposite to the accumulating direction under the effect of a rewinding force provided by the coil spring, and drives the driven member to rotate reversely through the external toothed ring. Meanwhile, the coil spring is contracted on the spring storage wheel gradually. In case that the driving member is located at the third position while the driven member rotates reversely, the driven member does not drive the driving connector connected thereto to rotate. In case that the driving member is located at the fourth position while the driven member rotates reversely, the driven member does not drive the input portion of the torsional direction switching mechanism connected thereto to rotate.

The window covering and the window covering operation mechanism of the present disclosure provide the following advantages:

Firstly, in comparison of operating the window covering through one single cord, which requires different pulling angles of the cord to distinguish the function to perform, the present disclosure provides corresponding operating hardware aimed at different functions to perform, e.g., the first transmission member and the second transmission member. Therefore, the users are not easily confused or mistaken during operation.

Secondly, regarding the window covering operation mechanism of the present disclosure, the driving member includes the annular body surrounding the driven member, which makes the overall mechanism more compact, takes up less space when installed in the upper rail, and does not limit the overall design of the appearance of the window covering.

Thirdly, the window covering and the window covering operation mechanism of the present disclosure do not include the cord loop that threatens child safety. Especially when the first transmission member and the second transmission member are all wrapped inside the control pull rod, the window covering has no exposed cords, eliminating the risk of children getting their necks entangled in the cords.

These and other objectives of the present disclosure will no doubt become obvious to those of ordinary skill in the art after reading the following detailed description of the preferred embodiment that is illustrated in the various figures and drawings.

BRIEF DESCRIPTION OF THE DRAWINGS

The present disclosure will be understood by referring to the following detailed description of some illustrative embodiments in conjunction with the accompanying drawings, in which.

DETAILED DESCRIPTION

Figure 1:
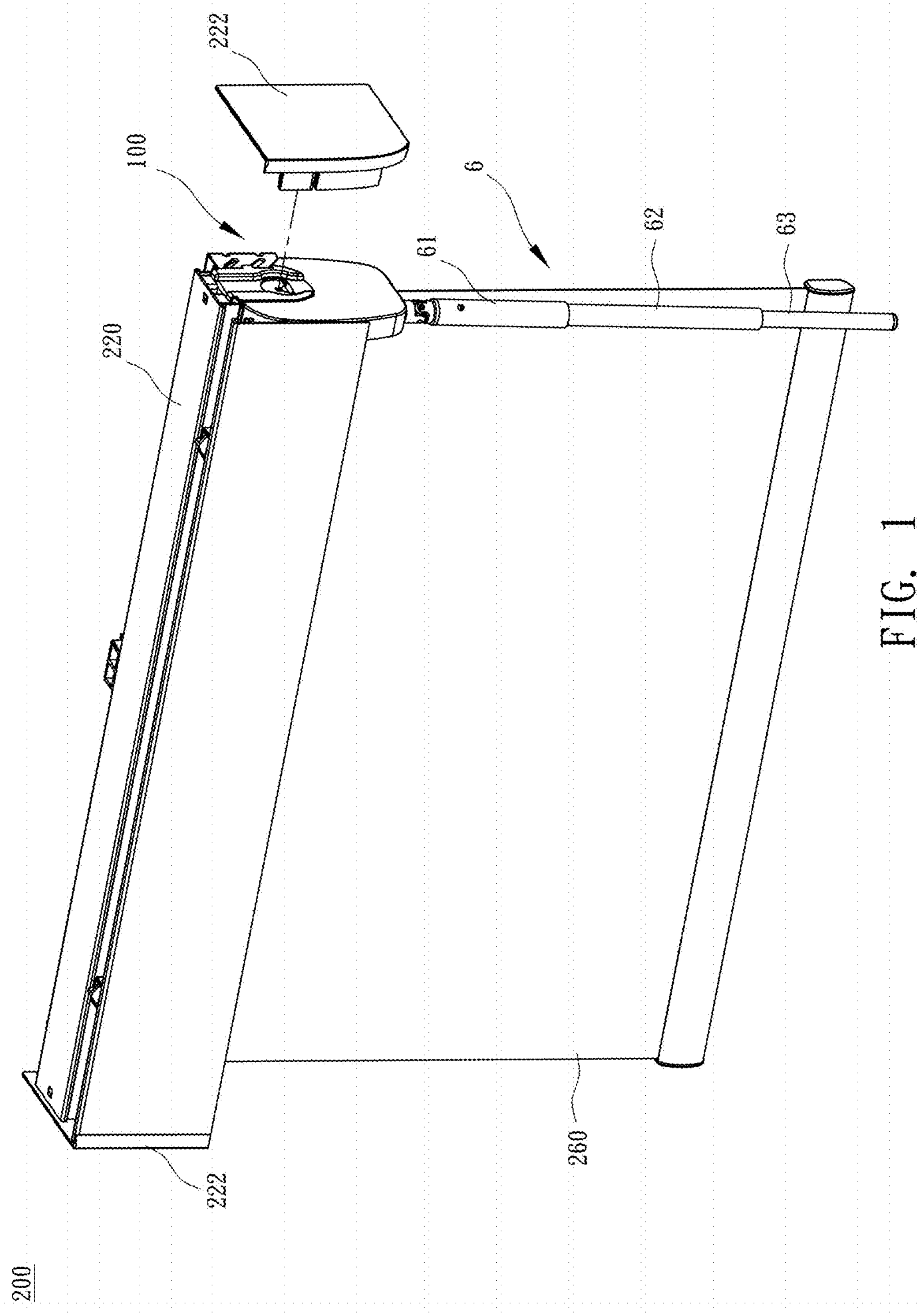
FIG. 1 is a partial exploded perspective view of a first embodiment of the window covering and the window covering operation mechanism thereof of the present disclosure.

In the following paragraphs and the accompanying drawings, the features and the implementations of several embodiments of the present disclosure are described in more detail along with the accompanying drawings. The features and the implementations described in the following paragraphs can be adopted solely or in combination with each other. In addition, the embodiments can be modified in various forms, as disclosed in the following paragraphs, and should not be limited to the embodiments described in the following paragraphs. Unless specified otherwise, the same reference characters refer to the same components.

The technical features provided in the present disclosure are not limited to the specific structures, uses, and applications described in the embodiments. The language used in the descriptions is illustrative and descriptive language which can be understood by the person of ordinary skill in the art. The terms regarding directions mentioned in the specification, including "front", "rear", "up", "down", "left", "right", "top", "bottom", "inside", and "outside", are illustrative and descriptive terms based on common usage scenarios, and manifests no intent to limit the scope of claims.

Furthermore, the definite and indefinite articles "a" and "the" and the numerical term "one" used in the specification referring to components of singular form do not exclude the concept of plural form. Equivalences known by one having ordinary skill in the art should be also included. All conjunctions used in similar situations should be interpreted in the broadest ways. The specific shapes, structural features, and technical terms described in the descriptions should also be interpreted to include equivalent structures and techniques which could achieve the same functionality.

Figure 2:
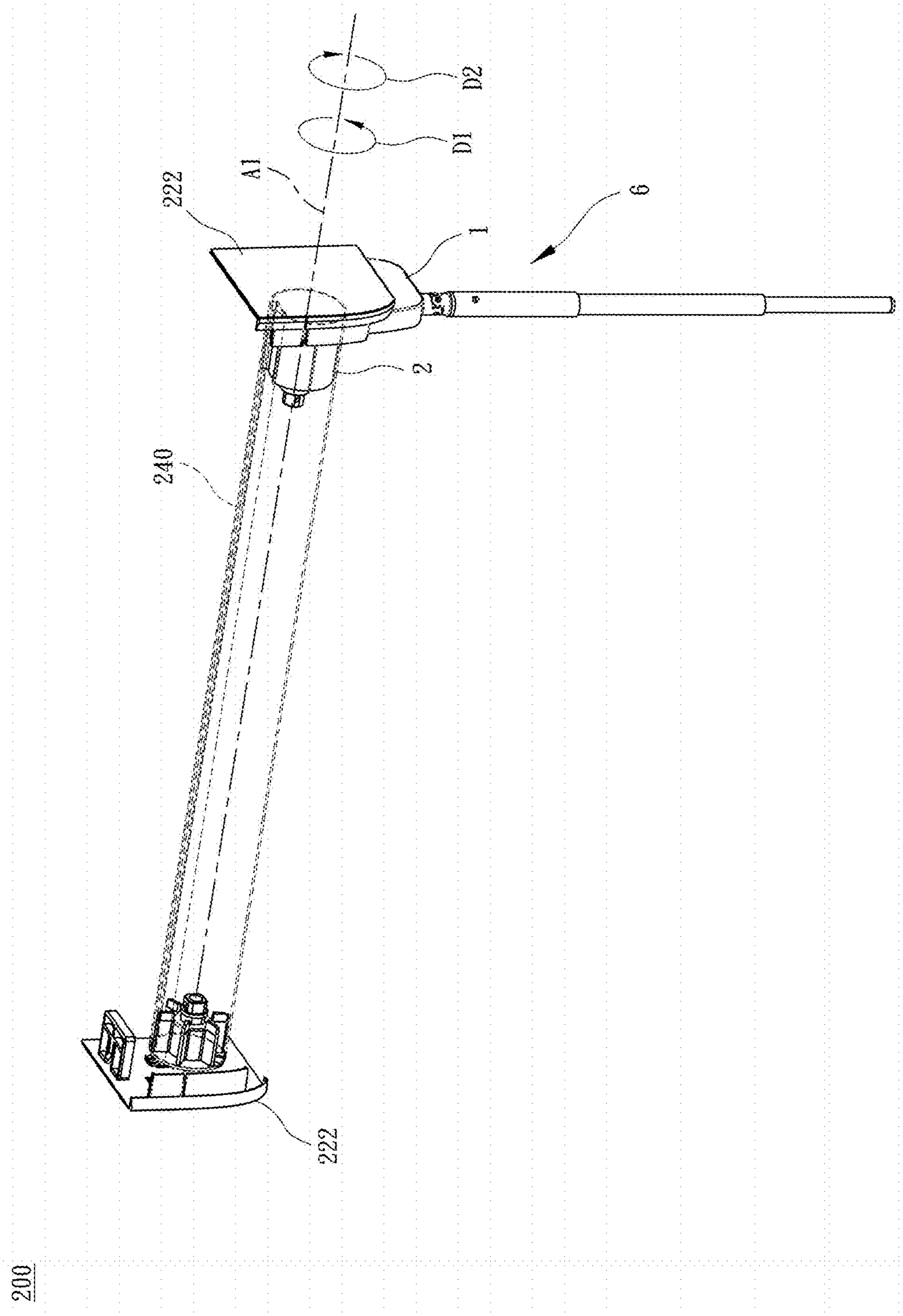
FIG. 2 is a perspective view of the window covering in FIG. 1 omitting the covering material and part of the headrail thereof.

Please refer to FIG. 1 and FIG. 2. In a first embodiment of the present disclosure, the window covering operation mechanism 100 is applied to a window covering 200. The window covering 200 comprises a headrail 220, a roller 240, and a cover material 260. The headrail 220 accommodates the roller 240 and has two lateral lids 222. The roller 240 extends along an axis A1 and is rotatable around the axis A1 in one of a forward direction D1 and a reverse direction D2. The reverse direction D2 is opposite to the forward direction D1. The roller 240 is an aluminum extruded pipe, with a longitudinally extending hollow protrusion on its inner circumference, forming a non-circular inner peripheral edge. The cover material 260 can be wound on the roller 240 or unwound from the roller 240 for implementing retraction and extension of the window covering 200.

Figure 3:
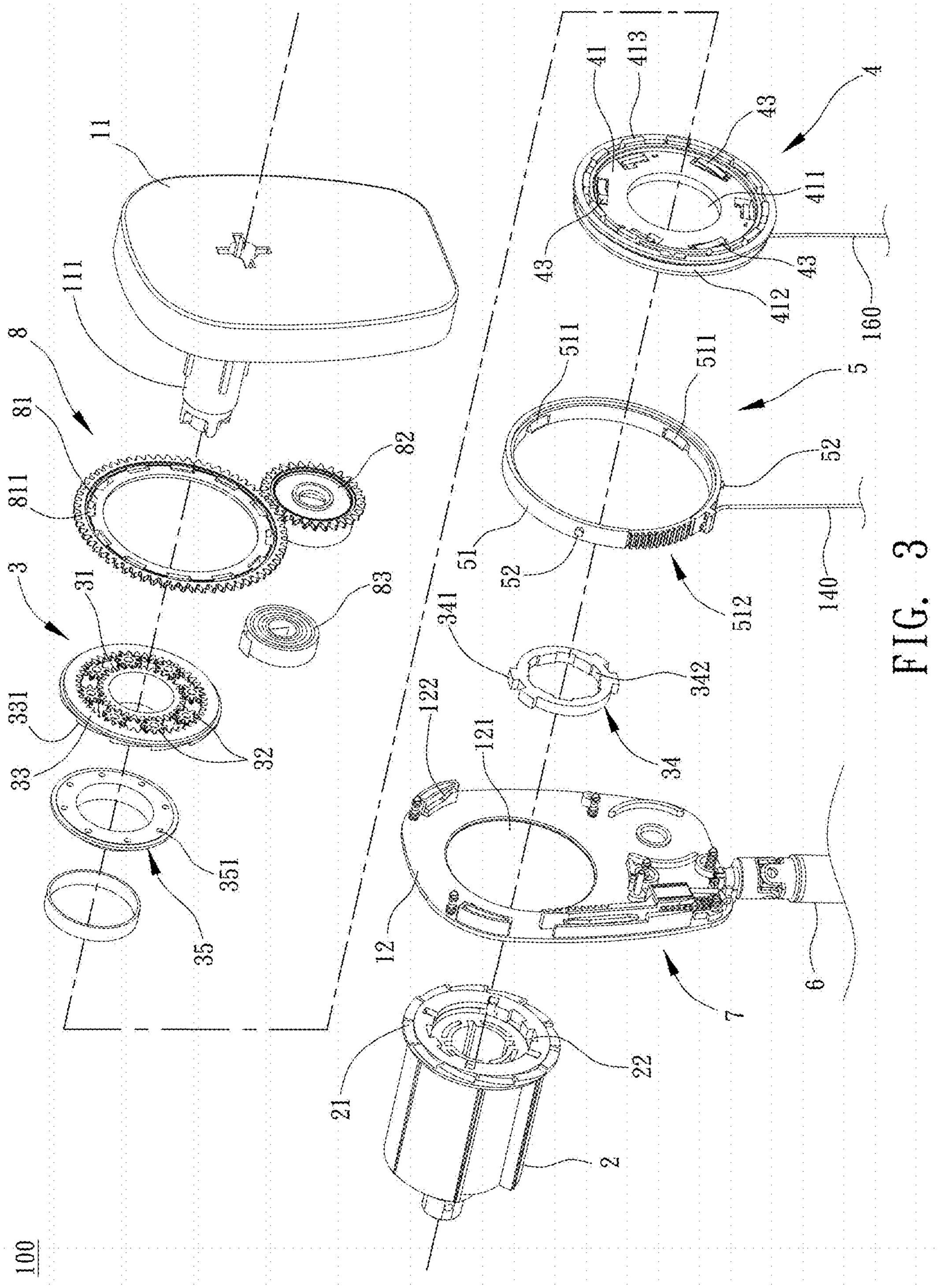
FIG. 3 is an exploded perspective view of the window covering operation mechanism in FIG. 1.
Figure 4:
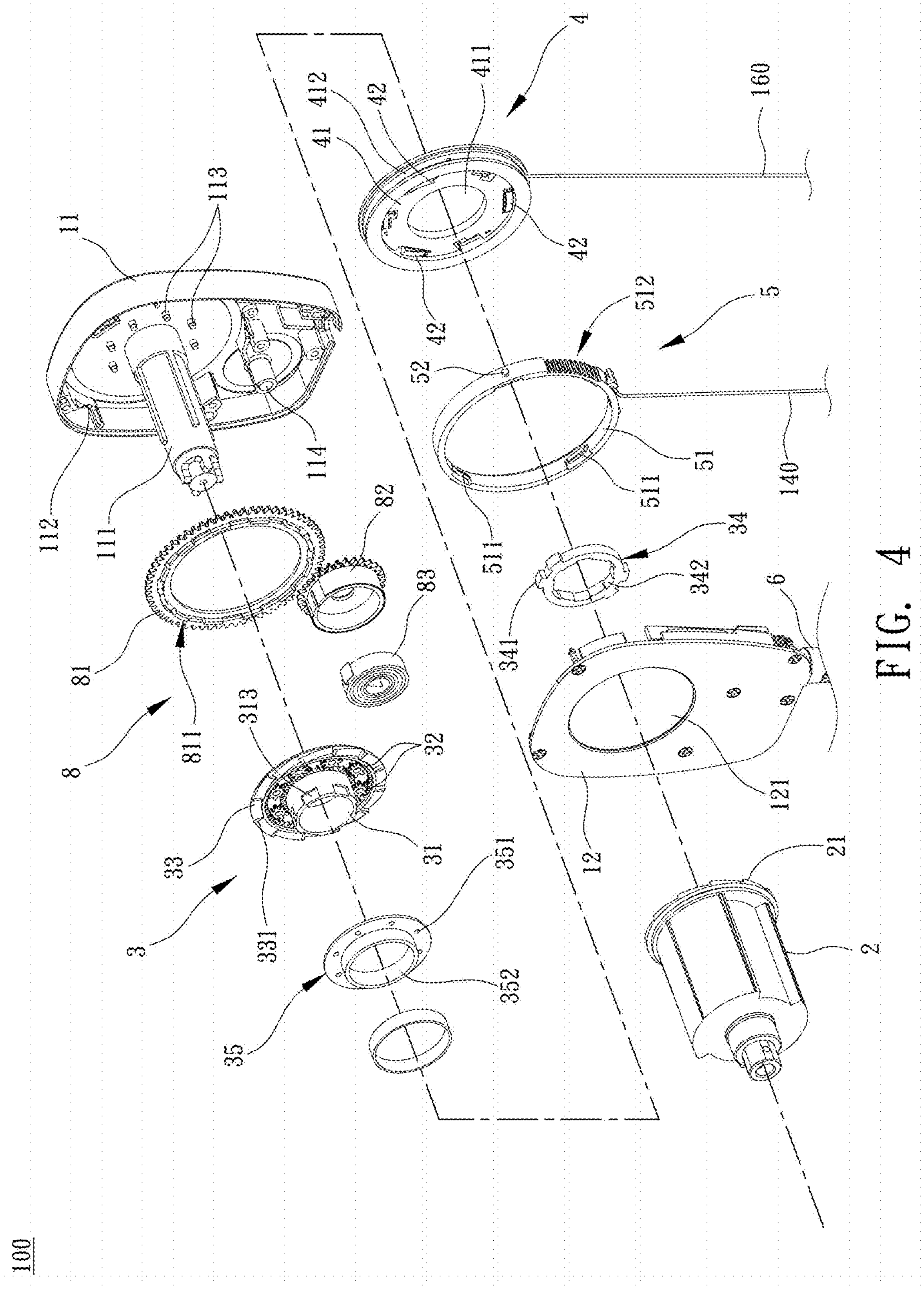
FIG. 4 is an exploded perspective view of the window covering operation mechanism in FIG. 1 from another view angle.

Please refer to FIGS. 2-4. The window covering operation mechanism 100 is located in the headrail 220 and disposed on one end of the roller 240, comprising a base 1, a driving connector 2, a torsional direction switching mechanism 3, a driven member 4, a driving member 5, a control pull rod 6, a locking mechanism 7, and a rewinding unit 8. The base 1 is composed of a first shell 11 and a second shell 12 secured to each other. The second shell 12 has an axial hole 121. The torsional direction switching mechanism 3, the driven member 4, the driving member 5, the control pull rod 6, the locking mechanism 7, and the rewinding unit 8 are accommodated within the base 1. The control pull rod 6 is mounted on the bottom end of the base 1.

As shown in FIG. 2, the outer contour of the driving connector 2 is securely engaged with the inner peripheral edge of the roller 240, allowing the roller 240 to rotate along with the driving connector 2. More specifically, the driving connector 2 can output a forward torsional force or a reverse torsional force to the roller 240, in which the forward torsional force can drive the roller 240 to rotate in the forward direction D1, and the reverse torsional force can drive the roller 240 to rotate in the reverse direction D2. As shown in FIG. 3, one end of the driving connector 2, which is other than the end of the driving connector 2 secured to the roller 240, passes the axial hole 121 and extends into the base 1, while an end surface thereon has a first ratchet structure 21 and a first interlocking structure 22. In the following context, when referring to an element rotating "forwardly", such a description is always directed to the element rotating in the forward direction D1. When referring to an element rotating "reversely", such a description is always directed to the element rotating in the reverse direction D2.

In the present disclosure, the window covering 200 is a roller blind but not limited thereto. The window covering operation mechanism 100 can also be applied to the other types of window coverings, such as a Venetian blind, a Roman blind, a honeycomb blind . . . etc. In another embodiment of the present embodiment, the window covering operation mechanism is applied to a Venetian blind. The roller of the Venetian blind is a solid shaft, collaborating with several reeling spools to retract or release multiple lift cords to implement retraction and extension of the Venetian blind. The driving connector has a non-circular hole (not shown), while the solid shaft has a non-circular cross section and is inserted into the non-circular hole of the driving connector, such that the solid shaft cannot rotate with respect to the driving connector. Moreover, a bolt may be penetrated through a segment of the solid shaft overlapping with the driving connector, thereby preventing the solid shaft from an axial movement with respect to the driving connector. As the driving connector is fixedly connected to an end of the solid shaft, upon the rotation of the driving connector, the solid shaft can be driven by the driving connector to rotate along with the driving connector.

Figure 5:
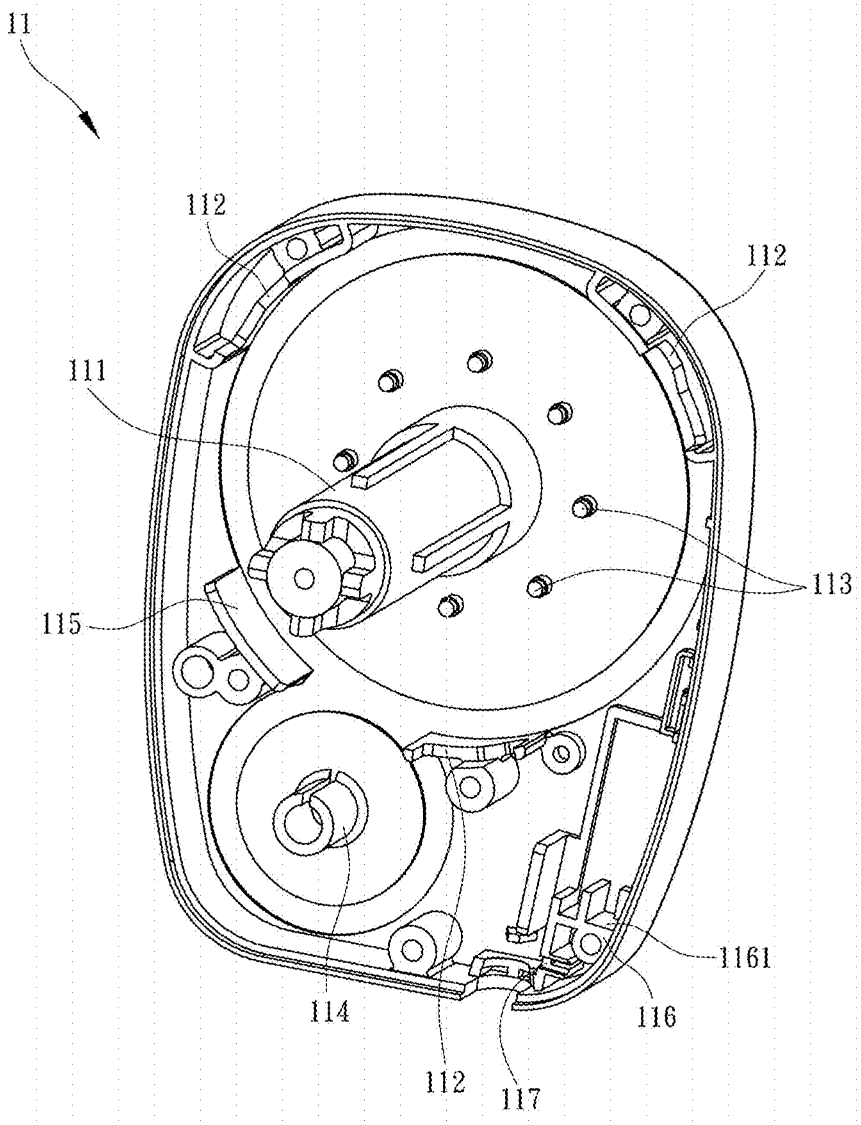
FIG. 5 is a perspective view of the first shell of the base in FIG. 4.
Figure 6:
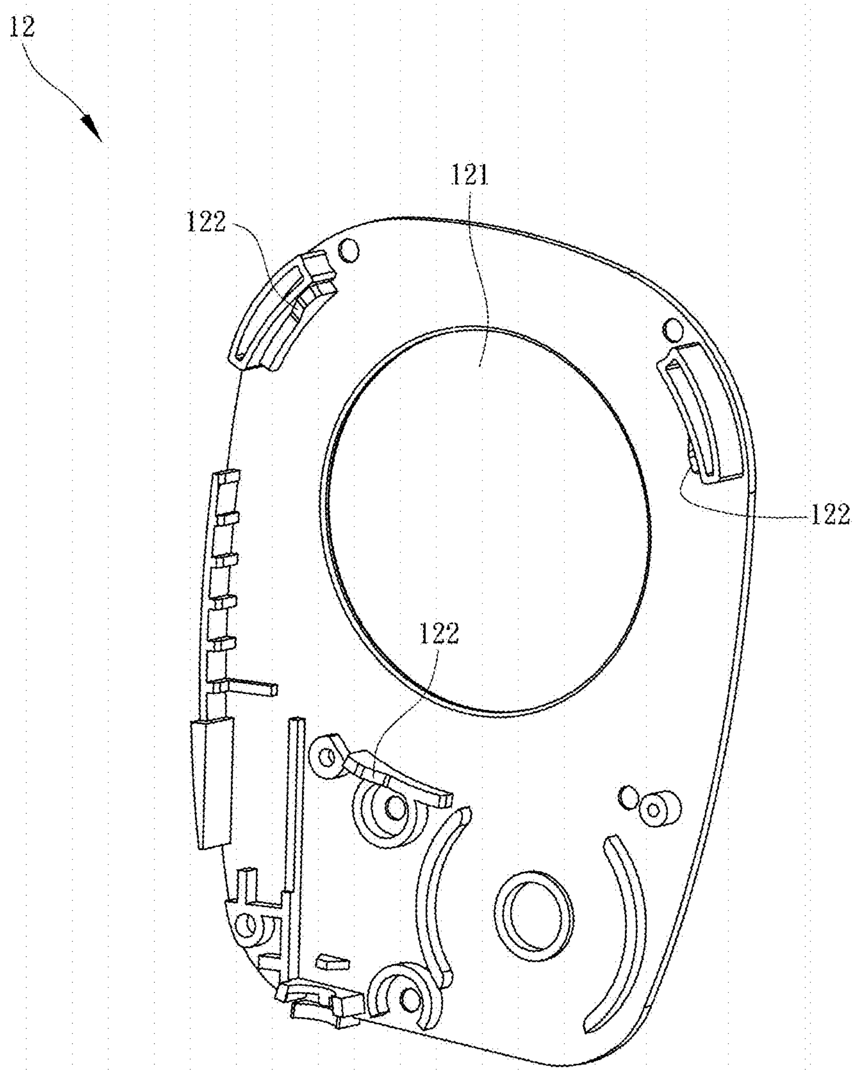
FIG. 6 is a perspective view of the second shell of the base in FIG. 3.
Figure 11:
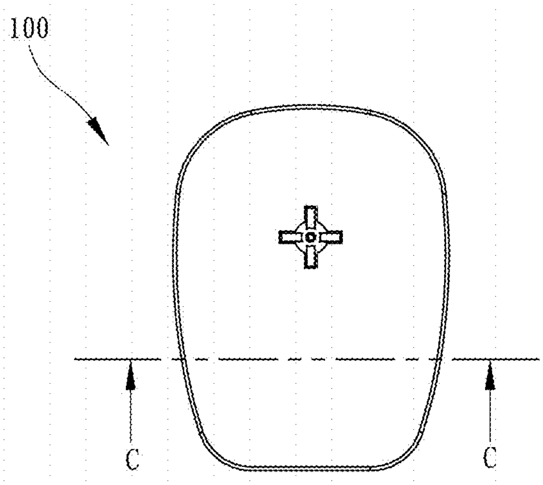
FIG. 11 is a lateral view of the window covering operation mechanism in FIG. 1 omitting the control pull rod.
Figure 11A:
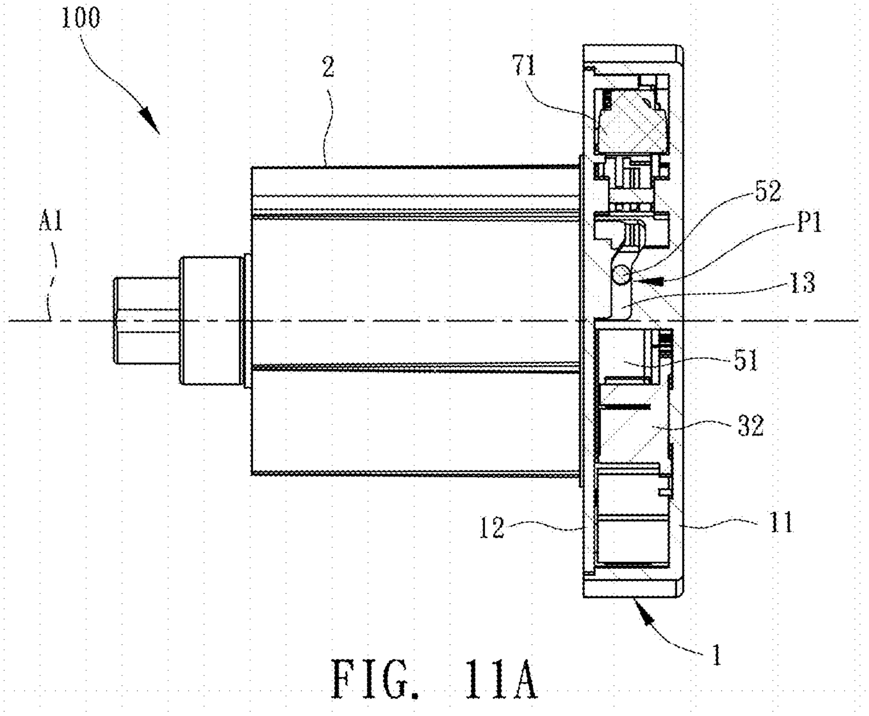
FIG. 11A is a cross-sectional view along line C-C in FIG. 11, in which the bumps of the driving member are located at the first position.
Figure 12:
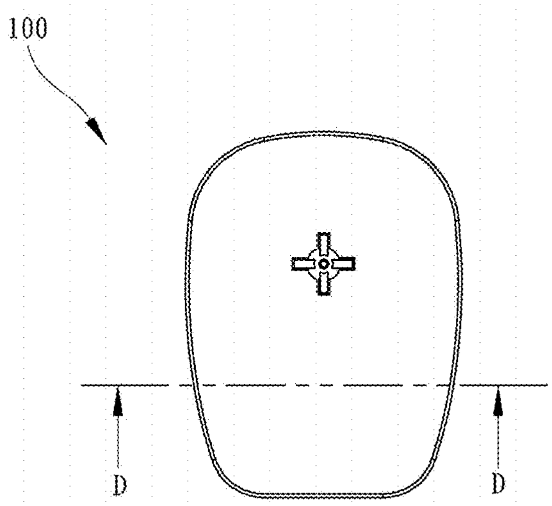
FIG. 12 is a lateral view of the window covering operation mechanism in FIG. 1 omitting the control pull rod.
Figure 12A:
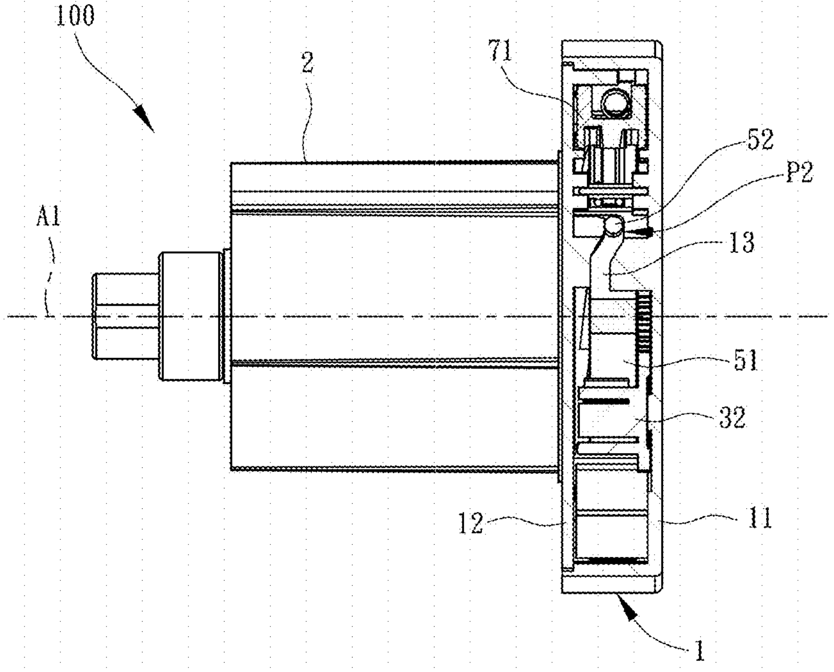
FIG. 12A is a cross-sectional view along line D-D in FIG. 12, in which the bumps of the driving member are located at the second position.
Figure 13:
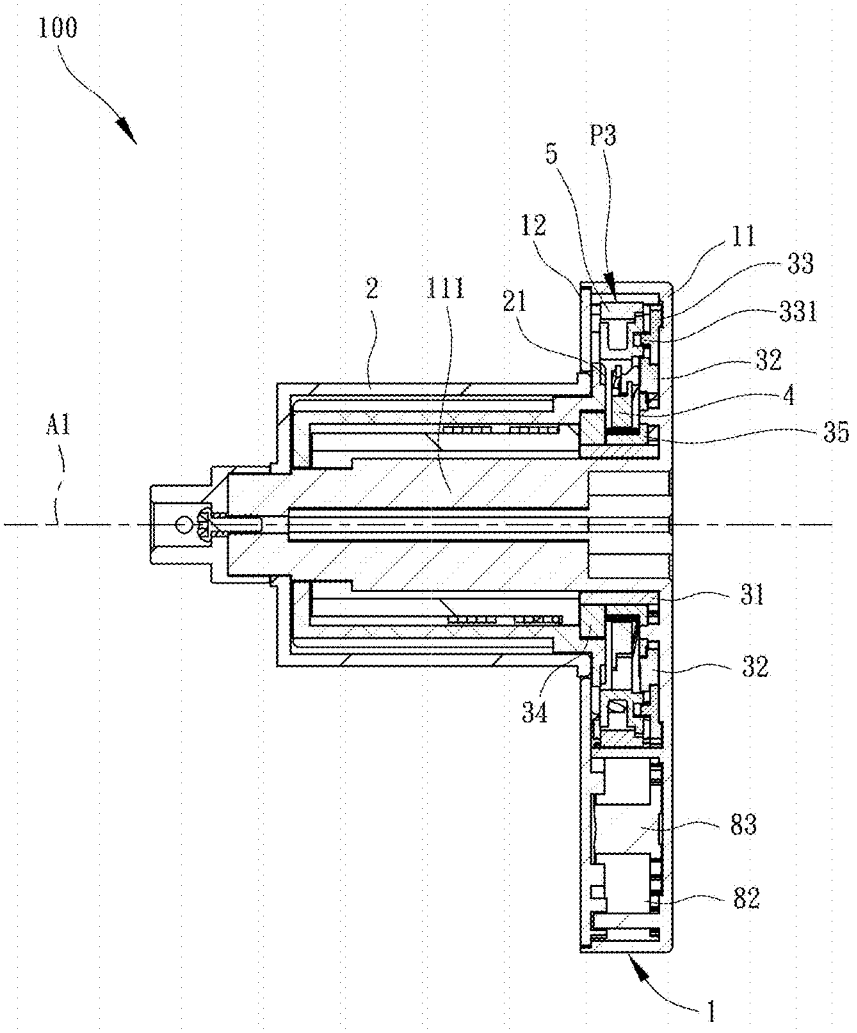
FIG. 13 is a cross-sectional view along line B-B in FIG. 9A, in which the driving member is located at the third position.
Figure 14:
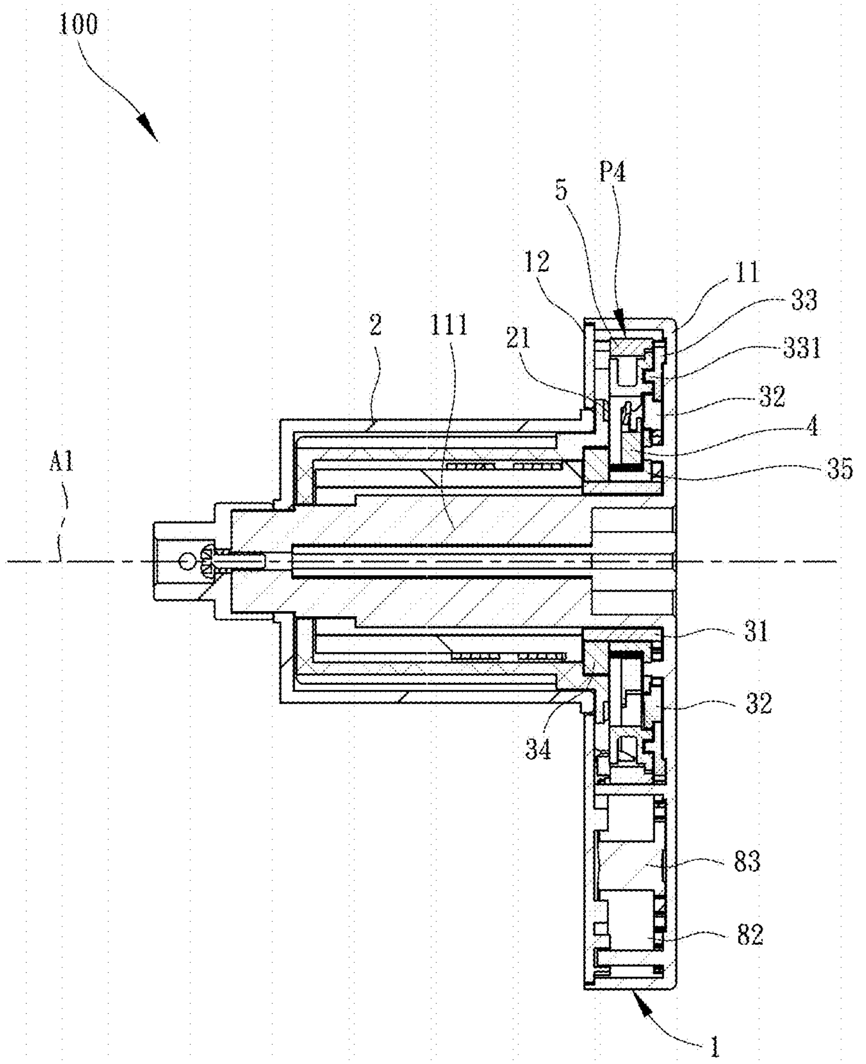
FIG. 14 is a cross-sectional schematic diagram of the window covering operation mechanism, in which the driving member is located at the fourth position.

The base 1 comprises plural first guiding structures. Please refer to FIGS. 3-6. As shown in FIG. 4 and FIG. 5, the first shell 11 comprises a supporting axle 111, three first inclined structures 112, plural posts 113, and a fixing post 114. The supporting axle 111, the posts 113, and the fixing post 114 all extend along the axis A1. The three first inclined structures 112 are uniformly arranged in a circular manner around the axis A1, with each pair of them forming an approximate 120-degree central angle with respect to the axis A1. As shown in FIG. 3 and FIG. 6, the second shell 12 comprises three second inclined structures 122 in addition to the axial hole 121. The three second inclined structures 122 correspond to the three first inclined structures 112 in location, respectively. When the first shell 11 is combined with the second shell 12, each of the first inclined structures 112 is combined with the respective second inclined structures 122, and each pair of the combined first inclined structure 112 and the second inclined structure 122 collectively form a guiding rail 13 (i.e., the first guiding structure), as shown in FIG. 11A and FIG. 12A. In the present disclosure, the base 1 includes three guiding rails 13 in total, but the base could also include two guiding rails only or more than three guiding rails in other embodiments as long as those guiding rails are uniformly arranged in a circular manner around the axis A1, which ensures the element engaged with those guiding rails uniformly stressed during its relative motion with respect to those guiding rails.

Figure 7:
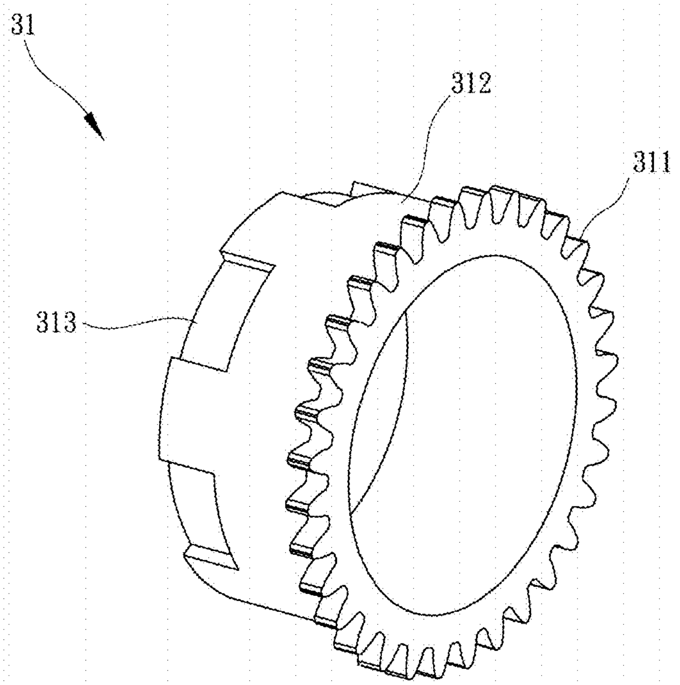
FIG. 7 is a perspective view of the central gear in FIG. 3.
Figure 8:
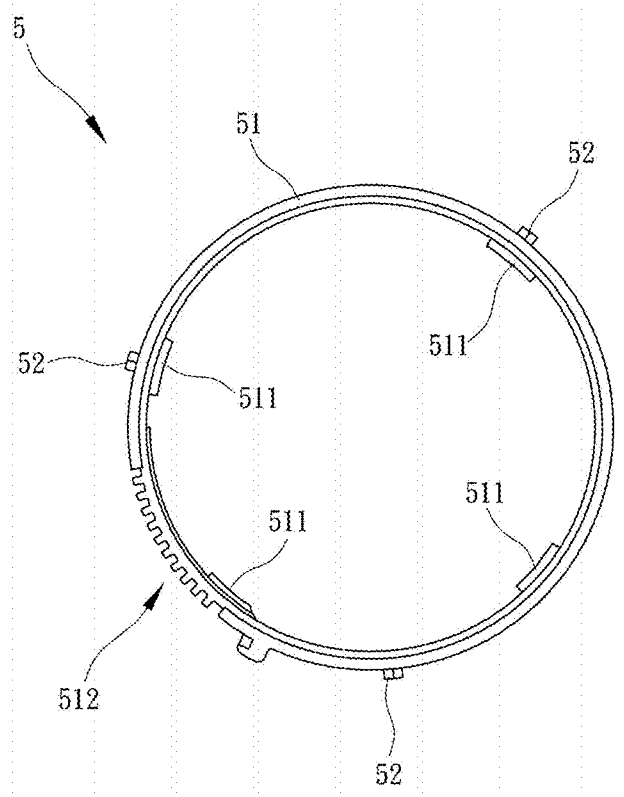
FIG. 8 is a perspective view of the driving member in FIG. 3.

The torsional direction switching mechanism of the present disclosure comprises an input portion and an output portion. The output portion is connected to the driving connector in a concurrently movable manner. When the input portion of the torsional direction switching mechanism is driven to rotate, the output portion correspondingly rotates in a direction opposite to the input portion, and drives the driving connector to rotate in the same direction as the output portion itself. Please refer to FIGS. 3, 4 and 7. In the present embodiment, the torsional direction switching mechanism 3 comprises a central gear 31, plural peripheral gears 32, an annular member 33, a linkage ring 34, and a bearing seat 35. The central gear 31 is sleeved on the supporting axle 111 of the first shell 11 and rotatable with respect to the supporting axle 111. The central gear 31 has a gear portion 311 and an axial portion 312. The axial portion 312 is cylindrical in structure and extends from the gear portion 311 to the roller 240 along the axis A1. Furthermore, a terminal end of the axial portion 312 has a second interlocking structure 313 radically distributed thereon serving as the output portion of the torsional direction switching mechanism 3. The peripheral gears 32 are engaged with the gear portion 311 of the central gear 31, respectively, as the peripheral gears 32 are distributed in an annular manner around the central gear 31. The posts 113 of the first shell 11 pass through the peripheral gears 32 respectively, and are inserted into several sockets 351 of the bearing seat 35 respectively, thereby fixing the peripheral gears 32 in the base 1 in a manner that the peripheral gears 32 are rotatable with respect to the bearing seat 35 around the respective posts 113. The annular member 33 is annular-shaped with an inner side of it formed with plural teeth. Moreover, the annular member 33 has a second ratchet structure 331 on one side thereof facing the roller 240 serving as the input portion of the torsional direction switching mechanism 3. The annular member 33 surrounds the peripheral gears 32 and the central gear 31 as the teeth on the inner side of the annular member 33 are engaged with the peripheral gears 32.

Please refer to FIG. 3 and FIG. 4. An outer side of the linkage ring 34 has an outer interlocking structure 341, while an inner side of the linkage ring 34 has an inner interlocking structure 342. The outer interlocking structure 341 is engaged with the first interlocking structure 22 of the driving connector 2. The inner interlocking structure 342 is engaged with the second interlocking structure 313 of the axial portion 312 of the central gear 31. With such a configuration, the central gear 31 establishes a synchronous transmission relationship with the driving connector 2 through the linkage ring 34. Therefore, when the central gear 31 rotates, the driving connector 2 is driven to rotate with the central gear 31 in the same direction. The purpose of the linkage ring 34 is to increase the convenience of assembly. In some other embodiments, the second interlocking structure of the central gear is directly engaged with the first interlocking structure of the driving connector, so that the central gear establishes a synchronous transmission relationship with the driving connector without the linkage ring.

Please refer to FIGS. 2-4. The driven member 4 comprises a main body 41, plural first elastic arms 42, and plural second elastic arms 43. The main body 41 is circular-shaped and has a central hole 411, an annular groove 412, and a first coupling structure 413. The annular groove 412 is formed on an outer peripheral edge of the main body 41. The first coupling structure 413 may be several latch columns uniformly arranged in a circular manner around the axis A1. The first elastic arms 42 and the second elastic arms 43 are respectively disposed on two opposite sides of the main body 41 facing and facing away from the driving connector 2. The main body 41 is sleeved on a seat post 352 of the bearing seat 35 via the central hole 411, whereby the driven member 4 is rotatable around the axis A1 with respect to the bearing seat 35 and movable along the axis A1 with respect to the bearing seat 35.

In the present disclosure, the amount of the first elastic arms 42 and the second elastic arms 43 is three for each, but is not limited thereto. The amount of the first elastic arms and the second elastic arms can be two or more than three. However, when the amount of the first elastic arms or the second elastic arms is two, they should be distributed on the main body of the driven member with the axis A1 as the center, and 180 degrees apart from each other around the axis A1.

In the present disclosure, the first elastic arms 42 and the second elastic arms 43 are each an independent component having a fixed end and a free end opposite to each other. For each of the first elastic arms 42 and the second elastic arms 43, the fixed end thereof is snap-fitted into the main body 41 while the free end thereof is swingable with respect to the fixed end when being subjected to force. In some other embodiments, the first elastic arms and the second elastic arms are each a structure integrally formed with the main body, also having a fixed end and a free end opposite to each other. For each of the first elastic arms and the second elastic arms, the fixed end thereof is connected to the main body and the free end thereof is swingable with respect to the fixed end when being subjected to force.

The driving member 5 comprises plural second guiding structures, which correspond to the first guiding structures (i.e., the guiding rails 13) in location, respectively. Please refer to FIGS. 2, 3, 4 and 8. The driving member 5 comprises an annular body 51 and three bumps 52 (i.e., the second guiding structures). An inner side of the annular body 51 has plural hooks 511, while an outer peripheral surface of the annular body 51 has a toothed portion 512. The hooks 511 extend inwardly along the radial directions of the annular body 51, and engaged with the annular groove 412 of the main body 41 in a direction along the axis A1. At the same time, the hooks 511 are allowed to slide in the annular groove 412 along a circumferential direction of the annular groove 412. Under this circumstance, the driving member 5 and the driven member 4 are combined in the direction along the axis A1, and the driving member 5 and the driven member 4 are rotatable with respect to each other around the axis A1 when at least one of them is subjected to force. The three bumps 52 are uniformly distributed on an outer peripheral surface of the annular body 51 with respect to the center of the annular body 51, with each pair of them forming an approximate 120-degree central angle with respect to the center of the annular body 51. The three bumps 52 protrude outwardly along the radial directions of the annular body 51 and are engaged with the guiding rails 13 of the base 1. Each of the bumps 52 is movable in the corresponding guiding rail 13 in response to and along with the rotation of the annular body 5, while the movement route of each of the bumps 52 is limited into its corresponding guiding rail 13.

The window covering operation mechanism 100 of the present disclosure further comprises a first transmission member and a second transmission member. In the present embodiment, as shown in FIG. 3 and FIG. 4, the first transmission member is exemplified by a reversal cord 140. One end of the reversal cord 140 is connected to the driving member 5, while the reversal cord 140 may be wound on at least part of the circumference of the driving member 5. Meanwhile, the other end of the reversal cord 140 extends out from the base 1 and stretches into the control pull rod 6. The second transmission member is exemplified by a lift cord 160. One end of the lift cord 160 is connected to the driven member 4, while the lift cord 160 may be wound on at least part of the circumference of the driven member 4. Meanwhile, the other end of the lift cord 160 extends out from the base 1 and stretches into the control pull rod 6.

Figure 9:
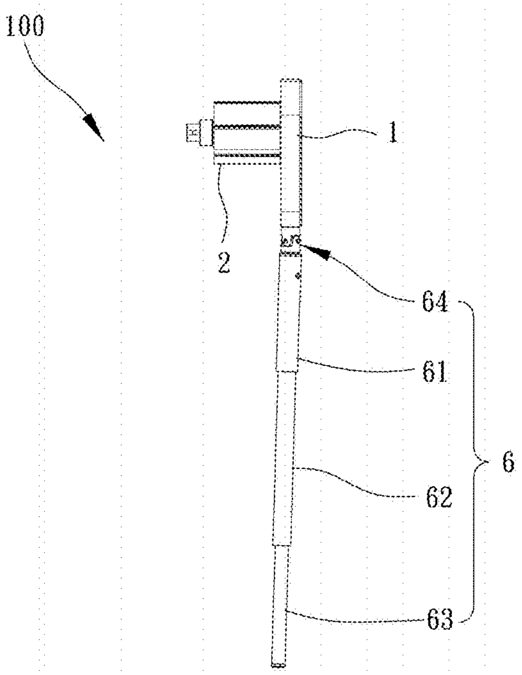
FIG. 9 is a front view of the window covering operation mechanism in FIG. 1.
Figure 9A:
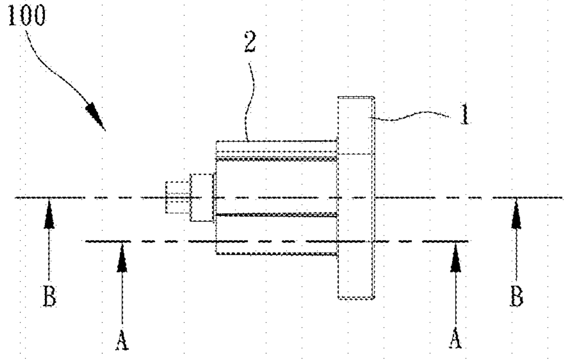
FIG. 9A is a top view of the window covering operation mechanism in FIG. 1.
Figure 10:
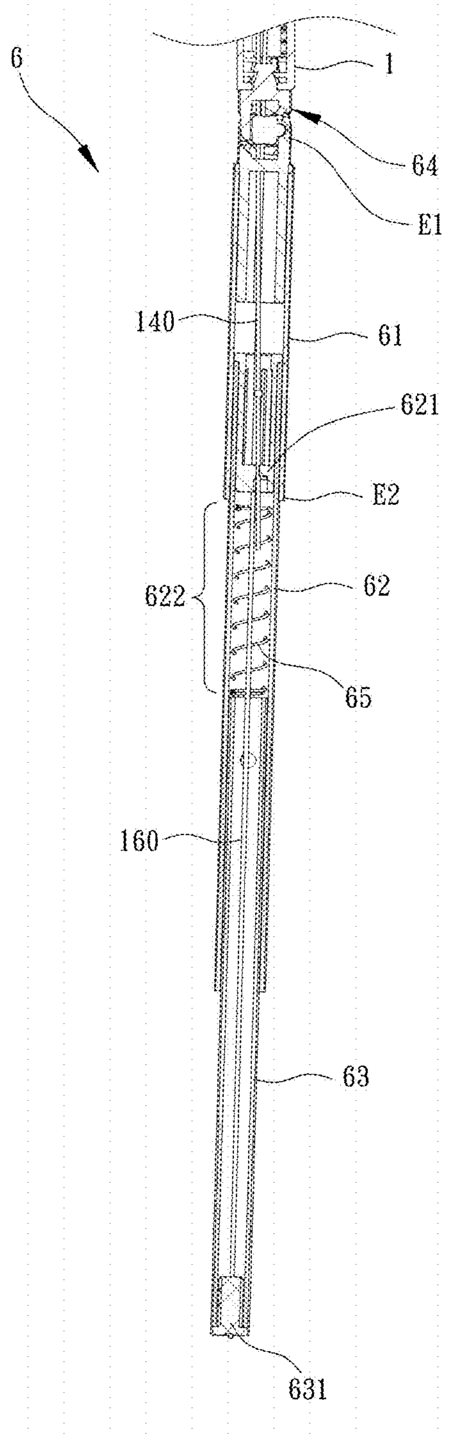
FIG. 10 is a partial cross-sectional view along line A-A in FIG. 9A.

Please refer to FIG. 9 and FIG. 10. The control pull rod 6 comprises a fixed shaft 61, a first shaft 62, a second shaft 63, a universal joint 64, and an elastic separator 65. The fixed shaft 61 has a first end E1 and a second end E2. The first end E1 of the fixed shift 61 is connected to the base 1 through the universal joint 64, such that the fixed shaft 61 can pivotally swing or rotate with respect to the base 1. An end of the first shaft 62 is equipped with a first end plug 621, while the aforesaid end of the first shaft 62 is slidably connected to the second end E2 of the fixed shaft 61, so that the first shaft 62 is retractable with respect to the fixed shaft 61 along an axial direction of the control pull rod 6. The other end of the reversal cord 140 rather than that is connected to the driving member 5, is fixed to the first end plug 621 of the first shaft 62 after passing through the universal joint 64 and stretching into the fixed shaft 61. The reversal cord 140 remains in a taut state. Under this circumstance, when the first shaft 62 is pulled out with respect to the fixed shaft 61 along the axial direction of the control pull rod 6, the reversal cord 140 is moved simultaneously, and the first shaft 62 drives the driving member 5 to rotate through such a movement of the reversal cord 140.

Please keep referring to FIG. 10. A bottom end of the second shaft 63 is equipped with a second end plug 631. Meanwhile, a top end of the second shaft 63 is slidably connected to the first shaft 62, so that the second shaft 63 is retractable with respect to the first shaft 62. The other end of the lift cord 160 rather than that is connected to the driven member 4 is fixed to the second end plug 631 after passing through the universal joint 64, the fixed shaft 61, the first shaft 62, and the second shaft 63 sequentially. The lift cord 160 remains in a taut state. Under this circumstance, when the second shaft 63 is pulled out with respect to the first shaft 62 along the axial direction of the control pull rod 6, the lift cord 160 is moved simultaneously, and the second shaft 63 drives the driven member 4 to rotate through such a movement of the lift cord 160.

In another embodiment of the present disclosure, the second end plug is disposed on the top end of the second shaft, and the other end of the lift cord rather than that is connected to the driven member is fixed to the second end plug after passing through the universal joint, the fixed shaft, and the first shaft sequentially. In other words, the second end plug can be disposed on the top or bottom end of the second shaft optionally.

Please refer to FIGS. 10-14. When the first shaft 62 is pulled out with respect to the fixed shaft 61 and thereby drives the driving member 5 to rotate, each of the bumps 52 of the driving member 5 is guided by the corresponding guiding rail 13 to move between a first position P1 (see FIG. 11A) and a second position P2 (see FIG. 12A), in which the second position P2 is farther away from the roller 240 than the first position P1. When the driving member 5 rotates and thereby drives each of the bumps 52 to move from the first position P1 to the second position P2, the entire driving member 5 is concurrently moved from a third position P3 (see FIG. 13) to a fourth position P4 (see FIG. 14) due to the deviation of the bumps 52, further leading to a movement of the driven member 4 towards the annular member 33. The aforesaid fourth position P4 is farther away from the roller 240 than the aforesaid third position P3. Oppositely, when the driving member 5 rotates and thereby drives each of the bumps 52 to move from the second position P2 to the first position P1, the entire driving member 5 is concurrently moved from the fourth position P4 to the third position P3 due to the deviation of the bumps 52. The reason that the bumps 52 and the guiding rails 13 of the base 1 are both uniformly distributed around the axis A1 is to ensure even force distribution on the driving member 5 as much as possible during the rotation of the driving member 5, keeping a central axis of the annular body 51 parallel to the axis A1 while the driving member 5 moves along the axis A1.

Please refer to FIGS. 3, 4, 10, and 13. Under the condition that the driving member 5 is located at the third position P3, when the second shaft 63 is pulled out with respect to the first shaft 62 and thereby drives the driven member 4 to rotate forwardly, the driven member 4 drives the driving connector 2 to rotate forwardly through the first elastic arms 42 in engagement with the first ratchet structure 21 of the driving connector 2, thereby outputting the forward torsional force to the roller 240. In the present embodiment, the roller 240 rotates forwardly when subjected to the forward torsional force, winding up the cover material 260 and leading to an upward movement of it. Therefore, the situation that the driving member 5 is located at the third position P3 represents the window covering 200 is in a covering-retracting control mode.

Please refer to FIGS. 3, 4, 10, and 14. Under the condition that the driving member 5 is located at the fourth position P4, when the second shaft 63 is pulled out with respect to the first shaft 62 and thereby drives the driven member 4 to rotate forwardly, the driven member 4 drives the annular member 33 to rotate forwardly through the second elastic arms 43 in engagement with the second ratchet structure 331 of the annular member 33. As the annular member 33 rotates forwardly, the annular member 33 drives the central gear 31 to rotate reversely via the peripheral gears 32, such that the central gear 31 outputs the reverse torsional force to the roller 240 through the linkage ring 34 and the driving connector 2. In this case, the second ratchet structure 331 of the annular member 33 is served as the output portion of the torsional direction switching mechanism 3. In the present embodiment, the roller 240 rotates reversely when being subjected to the reverse torsional force, releasing the cover material 260 and leading to a downward movement of the cover material 260. Therefore, the situation that the driving member 5 is located at the fourth position P4 represents the window covering 200 is in a covering-extending control mode.

The window covering of the present disclosure is always situated in one of the covering-retracting control mode and the covering-extending control mode. In the present embodiment, the forward and reverse directions of the rotation of the roller 240 correspond to the retraction and extension of the cover material 260, respectively, as a simple structural setting. However, the reverse configuration is also allowed.

In the above-mentioned embodiment, the annular member 33 of the torsional direction switching mechanism 3 plays a role as a delivery element for delivering the torsional force of the driven member 4 to the peripheral gears 32, but the structure of the delivery element and its relative position with respect to the driven member are not limited thereto. Any mechanism capable of achieving the equivalent function can replace the delivery element herein. For instance, in another embodiment of the present disclosure, the driving member and the driven member are installed on a side of the annular member of the torsional direction switching mechanism facing away from the roller. Meanwhile, the second ratchet structure of the annular member, which is served as the input portion of the torsional direction switching mechanism, is located on a side of the annular member facing the driven member. Thus, in a specified control mode, the second ratchet structure can be connected to the driven member.

In still another embodiment, the torsional direction switching mechanism merely includes one central gear and one peripheral gear, and does not have the annular member. The central gear comprises a gear portion and an axial portion. The axial portion protrudes from the gear portion towards the roller. The terminal of the axial portion is served as the output portion of the torsional direction switching mechanism and is engaged with the driving connector. Since the axial portion can be possibly linked to the driving connector in other ways for power transmission, the axis of the axial portion is not restricted to align with the rotational axis of the roller. The diameter of the peripheral gear is greater than the diameter of the central gear, and the peripheral gear is engaged with the gear portion of the central gear. Meanwhile, a side of the peripheral gear facing the driven member has a gear-surface ratchet structure (not shown in the figures), which is similar to the second ratchet structure 331 of the annular member 33 shown in FIG. 4 in structure, being served as the input portion of the torsional direction switching mechanism for transmitting the torsional force of the driven member to the peripheral gear. More specifically, under the condition that the driven member is located at the fourth position, when the driven member is driven to rotate, the driven member connects to the gear-surface ratchet structure (not shown in the figures) and thereby drives the peripheral gear to rotate in the same direction.

Figure 15:
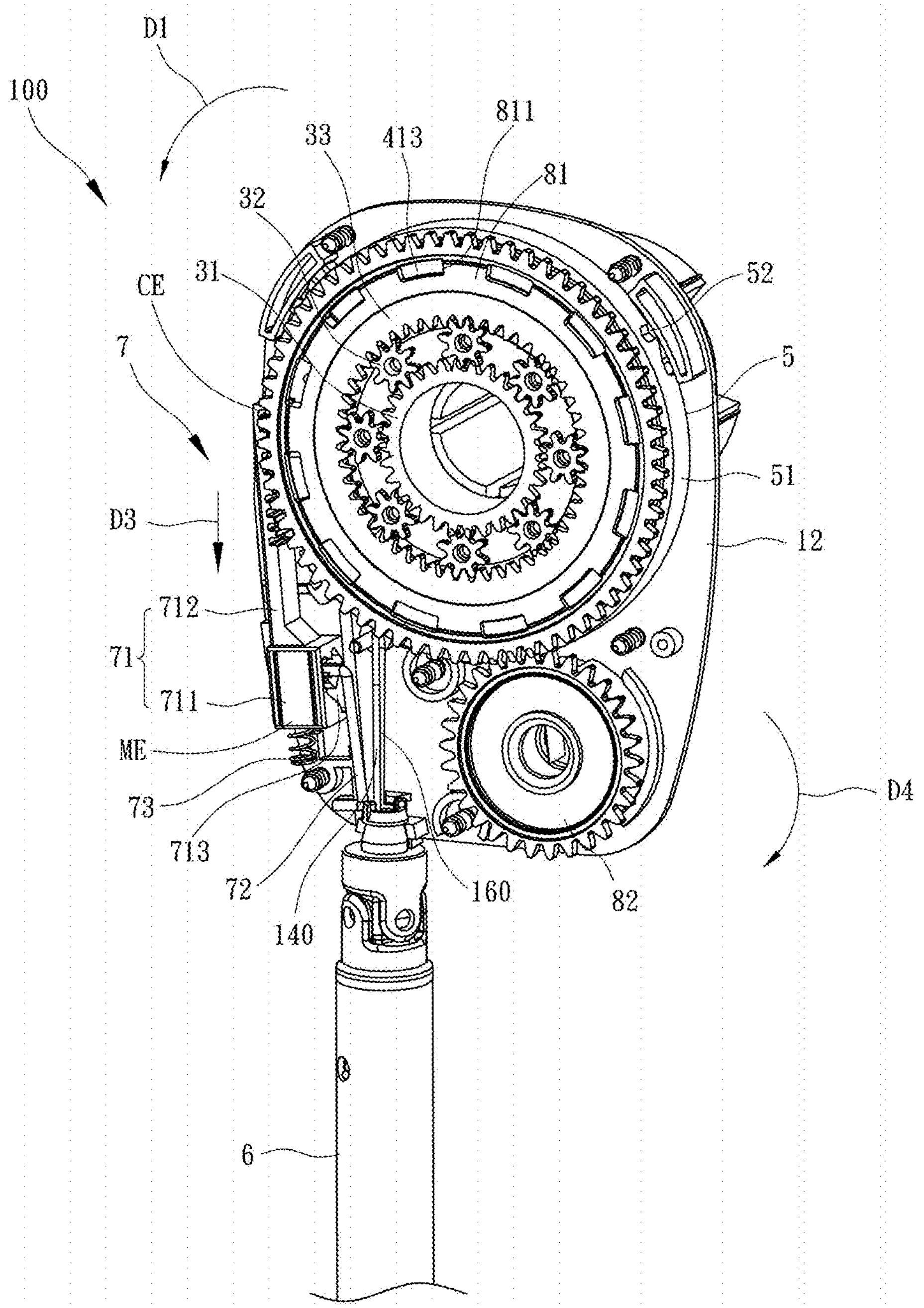
FIG. 15 is a partial perspective view of the window covering operation mechanism in FIG. 1 omitting the first shell.
Figure 16:
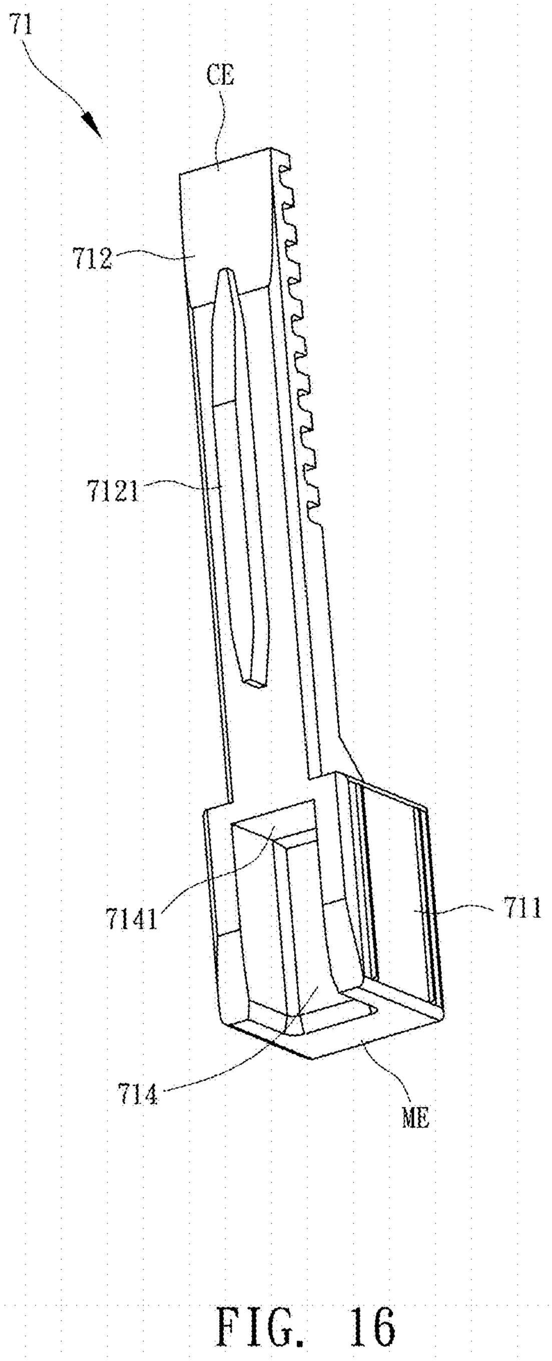
FIG. 16 is a perspective view of the moving member in FIG. 15.

Please refer to FIG. 15 and FIG. 16, and refer to FIGS. 3-6 at the same time. When the driving member 5 is driven by the reversal cord 140 to rotate, the driving member 5 always rotates towards a specified direction, i.e., the forward direction D1 in the present embodiment. Consequently, the locking mechanism 7 moves the driving member 5 to one of the third position P3 and the fourth position P4, and then positions the driving member 5 in place. In the present embodiment, the locking mechanism 7 comprises a moving member 71, a locking stick 72, and a restoring member 73. The moving member 71 comprises a bulk 711 and a rack 712, in which the rack 712 protrudes from the bulk 711 upwardly. Meanwhile, the moving member 71 has a connecting end CE and a moving end ME opposite to each other. The connecting end CE is located at the rack 712 and links to the driving member 5 in an engagement manner. The moving end ME is located on the bulk 711 and has a cycling groove 713 formed thereon. When the driving member 5 is driven by the reversal cord 140 to rotate, the driving member 5 drives the moving member 71 to move in a first direction D3, causing the moving end ME of the moving member 71 to move in the first direction D3 simultaneously. The side of the bulk 711 opposite to where the cycling groove 713 is formed further has a concave chamber 714. The side of the rack 712 opposite to where to engage the driving member 5 further has a positioning bulge 7121. The collaboration of the positioning bulge 7121 with a limiting structure of the base 1 confines the moving member 71 to be movable along the first direction D3.

Continue referring to FIG. 15 and FIG. 16, and refer to FIG. 5 at the same time. The first shell 11 further comprises a curved fixing film 115, an obstructing structure 116, and a locking stick fixing structure 117. The curved fixing film 115 can prevent the annular body 51 of the driving member 5 from deforming while the annular body 51 rotates, ensuring smooth rotation of the annular body 51. The locking stick 72 may be made of a material with certain rigidity, such as a steel wire or a hard plastic rod. One end of the locking stick 72 is fixed to the locking stick fixing structure 117, while the other end of the locking stick 72 extends into the cycling groove 713. The restoring member 73 may be a spring, and is disposed between the obstructing structure 116 of the first shell 11 and the bottom of the moving member 71 along the first direction D3. Preferably, the restoring member 73 is partially received in the concave chamber 714, as the two ends of the restoring member 73 abut between a first contact surface 1161 (see FIG. 5) of the obstructing structure 116 and a second contact surface 7141 (see FIG. 16) of the concave chamber 714.

Figure 17:
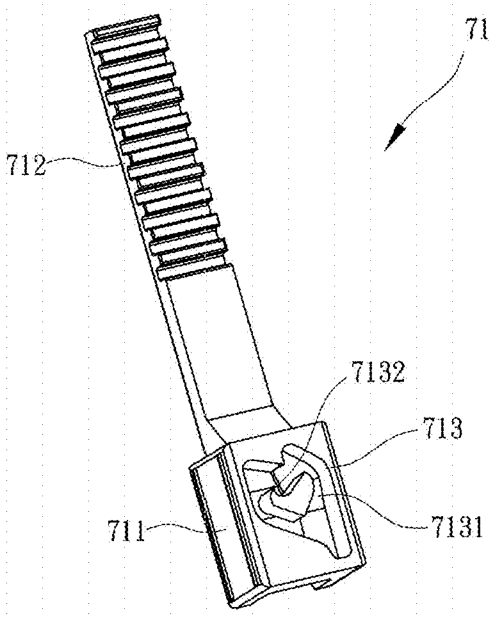
FIG. 17 is a perspective view of the moving member in FIG. 15 from another view angle.
Figure 18:
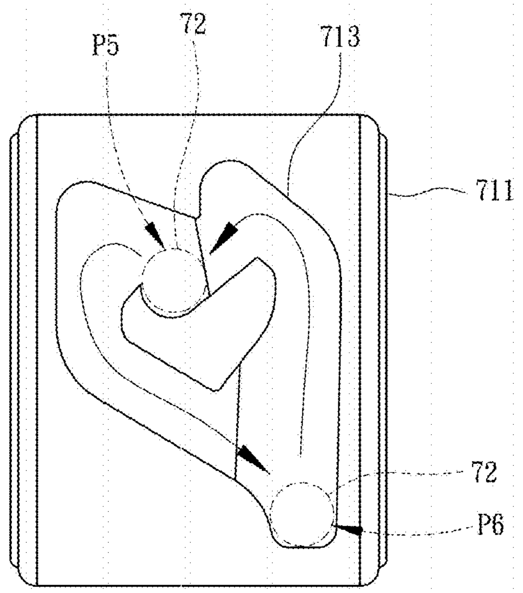
FIG. 18 is a schematic diagram illustrating the relative positions of the locking stick in FIG. 15 within the cycling groove.

Please refer to FIG. 15 together with FIG. 17 and FIG. 18. When the reversal cord 140 is subjected to force and thereby drives the driving member 5 to rotate, the driving member 5 drives the moving member 71 to move, causing the moving end ME of the moving member 71 to move in the first direction D3. Thereafter, when the reversal cord 140 stops being subjected to force, the restoring member 73 exerts an elastic force opposite to the first direction D3 on the moving member 71, causing the moving member 71 to move roughly in a direction opposite to the first direction D3 until an inner wall of the cycling groove 713 is blocked by the locking stick 72. At this point, the moving member 71 is in a stationary state, and the locking stick 72 is positioned within the cycling groove 713 at one of a forward position P5 and a reverse position P6.

In further detail, if the locking stick 72 is originally located in the cycling groove 713 at the forward position P5, the above-mentioned actions change the relative positions of the locking stick 72 and the moving member 71, whereby the locking stick 72 is changed to be positioned in the cycling groove 713 at the reverse position P6. Oppositely, if the locking stick 72 is originally located in the cycling groove 713 at the reverse position P6, the above-mentioned actions change the relative positions of the locking stick 72 and the moving member 71, whereby the locking stick 72 is changed to be positioned in the cycling groove 713 at the forward position P5. In the process of the above-mentioned actions, the locking stick 72 remains stationary while the cycling groove 713 of the moving member 71 is the one sliding with respect to the locking stick 72. Such a slide relative movement guides the moving end ME of the moving member 71 to slightly deviate during its reverse movement caused by the elastic force provided by the restoring member 73. Therefore, each time after the above-mentioned actions are finished, the moving member 71 stops moving and is positioned at different positions, resulting in the locking stick 72 located within the cycling groove 713 at different positions. When the locking stick 72 is located within the cycling groove 713 at the forward position P5, the driving member 5 is positioned at the third position P3. When the locking stick 72 is located within the cycling groove 713 at the reverse position P6, the driving member 5 is positioned at the fourth position P4.

In summary, each time after the driving member 5 has been driven by the reversal cord 140 to rotate, the locking mechanism 7 alters the driving member 5 from one of the third position P3 and the fourth position P4 to the other one of the third position P3 and the fourth position P4 for correspondingly switching the window covering 200 between the covering-retracting control mode and the covering-extending control mode. Moreover, each time after the downward dragging operation of the reversal cord 140 is finished, the window covering 200 does not stay in any situation other than the covering-retracting control mode and the covering-extending control mode, e.g., a transitioning state in which the driven member 4 idle spins in response to the downward dragging operation of the lift cord 160.

Figure 17A:
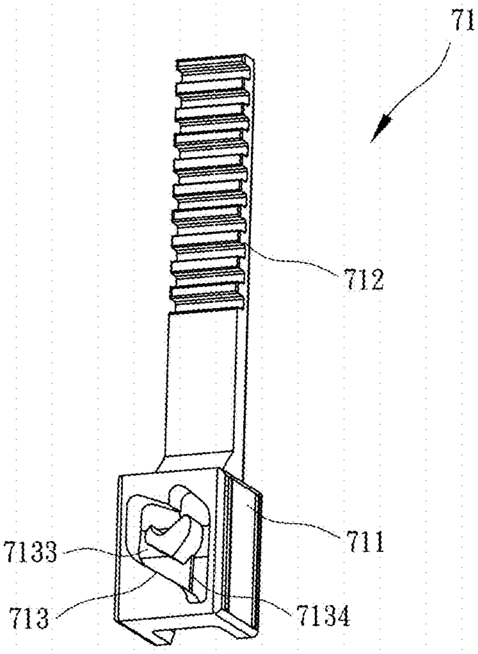
FIG. 17A is a perspective view of the moving member in FIG. 15 from further another view angle.

Please refer to FIGS. 17, 17A, and 18. In the present embodiment, in the direction of the relative movement of the locking stick 72 with respect to the cycling groove 713 (designated by the two arrows shown in FIG. 18), the bottom of the cycling groove 713 presents a slope structure 7131 and a stepped structure 7132 in a path directed from the reverse position P6 to the forward position P5, wherein the slope structure 7131 transitions from deep to shallow, and the stepped structure 7132 exhibits a difference in level from shallow to deep. In a similar manner, in the direction of the relative movement of the locking stick 72 with respect to the cycling groove 713 (designated by the two arrows shown in FIG. 18), the bottom of the cycling groove 713 presents a slope structure 7133 and a stepped structure 7134 in a path directed from the forward position P5 to the reverse position P6, wherein the slope structure 7133 transitions from deep to shallow, and the stepped structure 7134 exhibits a difference in level from shallow to deep. The above-mentioned structural design facilitates the cycling groove 713 to slide smoothly with respect to the locking stick 72, making the locking stick 72 finally engaged with the cycling groove 713 at either the forward position P5 or the reverse position P6 rather than any other position. As a result, the driving member 5 is ensured to be positioned at either the third position P3 or the fourth position P4, leading to the window covering 200 always being in either the covering-retracting control mode or the covering-extending control mode after a downward dragging operation of the reversal cord 140 is finished.

Please refer to FIGS. 19-23, which show a second embodiment of the window covering operation mechanism of the present disclosure. The main difference between the window covering operation mechanism 100' in the present embodiment and the window covering operation mechanism 100 in the first embodiment is manifested in the locking mechanisms, and the guiding structures of the bases collaborating with the driving members thereof are also different. The window covering operation mechanism 100' is applied to a window covering (not shown) with a roller (not shown) extending along an axis A2 and rotatable around the axis A2. The window covering operation mechanism 100' has a driving connector 2 connecting to the roller, so that the roller is concurrently rotatable along with the driving connector 2. The base 1' of the window covering operation mechanism 100' comprises a first shell 11' and a second shell 12'. The first shell 11' comprises a supporting axle 111', three bumps 112' (only one of them is shown), and a grooved body fixing structure 113'. The supporting axle 111' extends along the axis A2. The three bumps 112' are distributed uniformly in a circular pattern around the supporting axle 111'. The driving member 5' of the window covering operation mechanism 100' comprises an annular body 51' and three guiding rails 52' (only two of them are shown), in which the three guiding rails 52' are concavely formed on an outer peripheral surface of the annular body 51' inwardly along the radial directions of the annular body 51', and are uniformly distributed on the outer peripheral surface of the annular body 51' with each pair forming approximately 120-degree central angle with respect to a center of the annular body 51'. Additionally, the outer peripheral surface of the annular body 51' has a pivotal connecting portion 511'.

Figure 21:
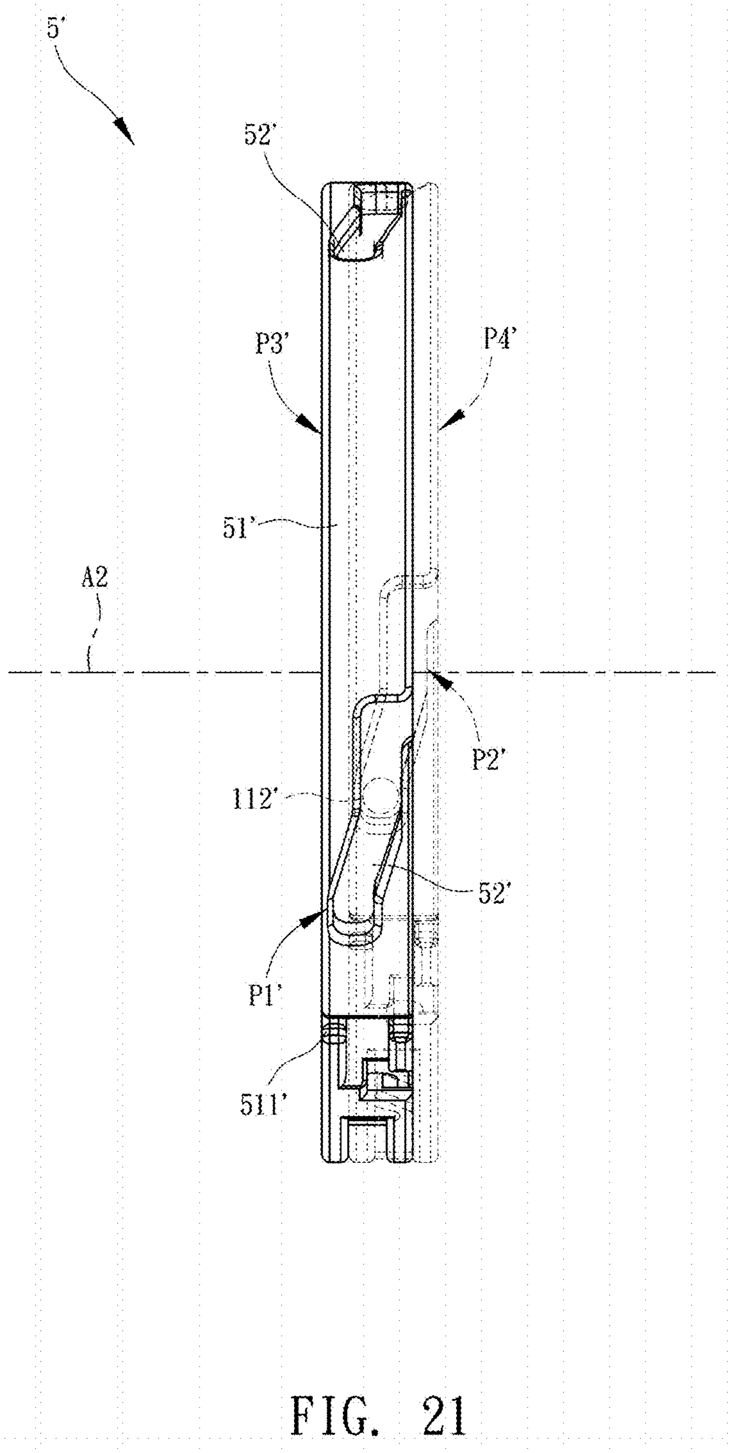
FIG. 21 is a schematic diagram illustrating the guiding rails of the driving member in FIG. 19 moving from the second position to the first position with respect to the bumps of the base.

Keep referring to FIGS. 19-23. The three guiding rails 52' of the driving member 5' are engaged with the three bumps 112' of the first shell 11', respectively. Consequently, each of the guiding rails 52' is movable between a first position P1' and a second position P2' with respect to the corresponding one of the bumps 112' along with rotation of the annular body 51' of the driving member 5', as shown in FIG. 21. The second position P2' is farther away from the driving connector 2 than the first position P1', which means the second position P2' is farther away from the roller. When one end of the first transmission member (not shown) of the window covering operation mechanism 100' extending out from the base 1' is subjected to force and thereby drives the driving member 5' to rotate, each of the guiding rails 52' moves from the second position P2' to the first position P1' with respect to the corresponding bump 112', as shown in FIG. 21. Concurrently, the driving member 5' moves from a fourth position P4' to a third position P3' along the axis A2, wherein the third position P3' is closer to the driving connector 2 than the fourth position P4', which means the third position P3' is closer to the roller. Oppositely, when the driving member 5' rotates in a manner that each of the guiding rails 52' moves from the first position P1' to the second position P2' with respect to the corresponding bump 112', the driving member 5' concurrently moves from the third position P3' to the fourth position P4' along the axis A2.

Figure 19:
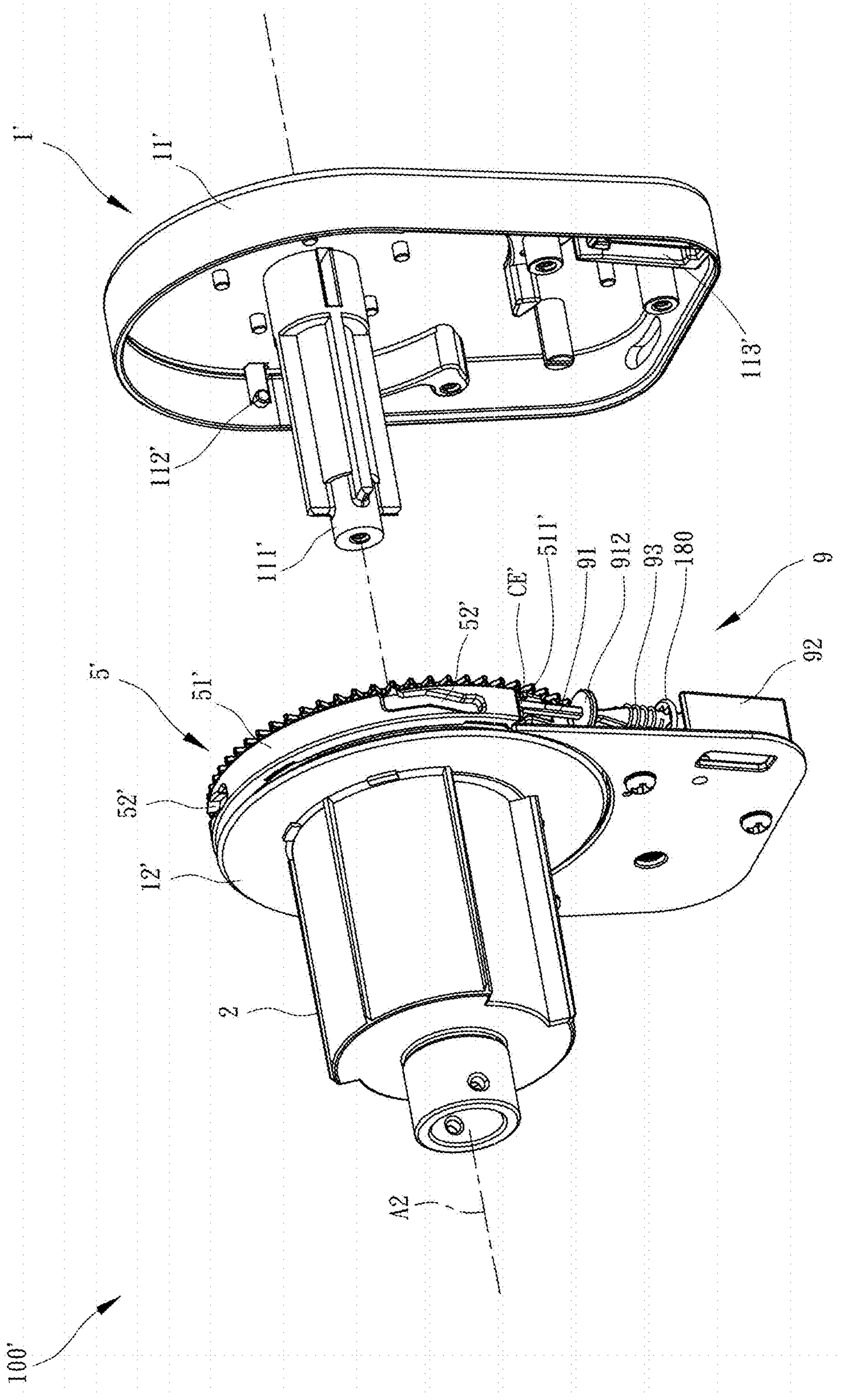
FIG. 19 is an exploded schematic diagram of a second embodiment of the window covering operation mechanism of the present disclosure omitting the first transmission member and the second transmission member.
Figure 20:
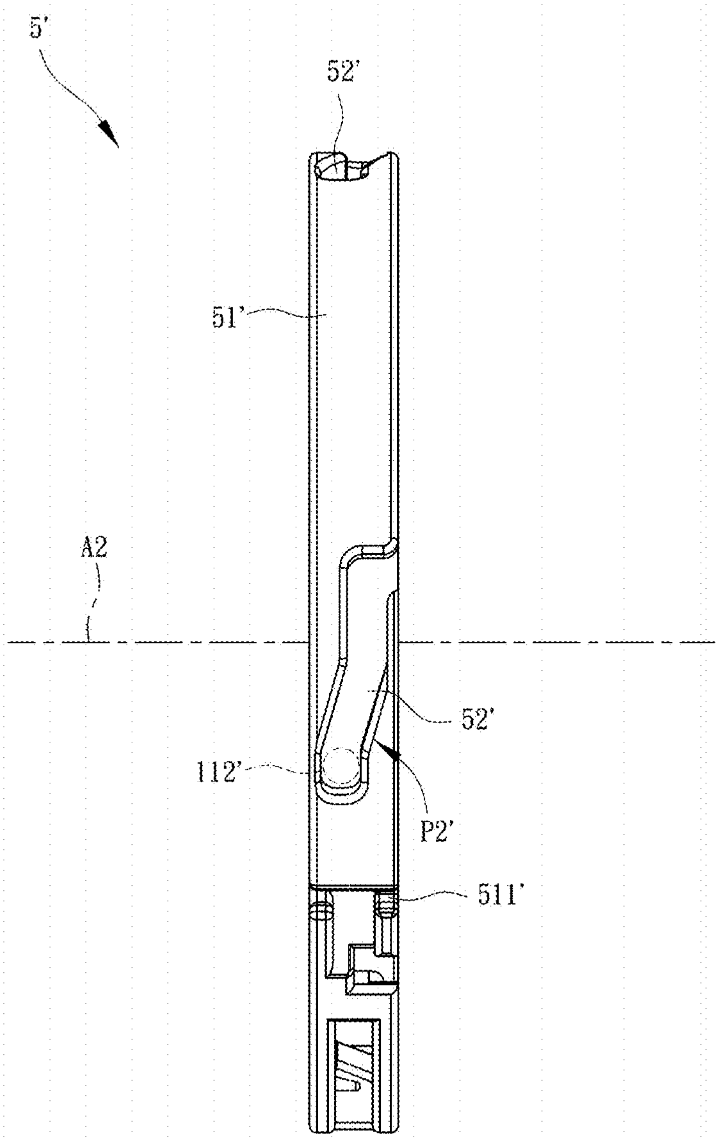
FIG. 20 is a schematic diagram illustrating the guiding rails of the driving member in FIG. 19 located at the second position.
Figure 22:
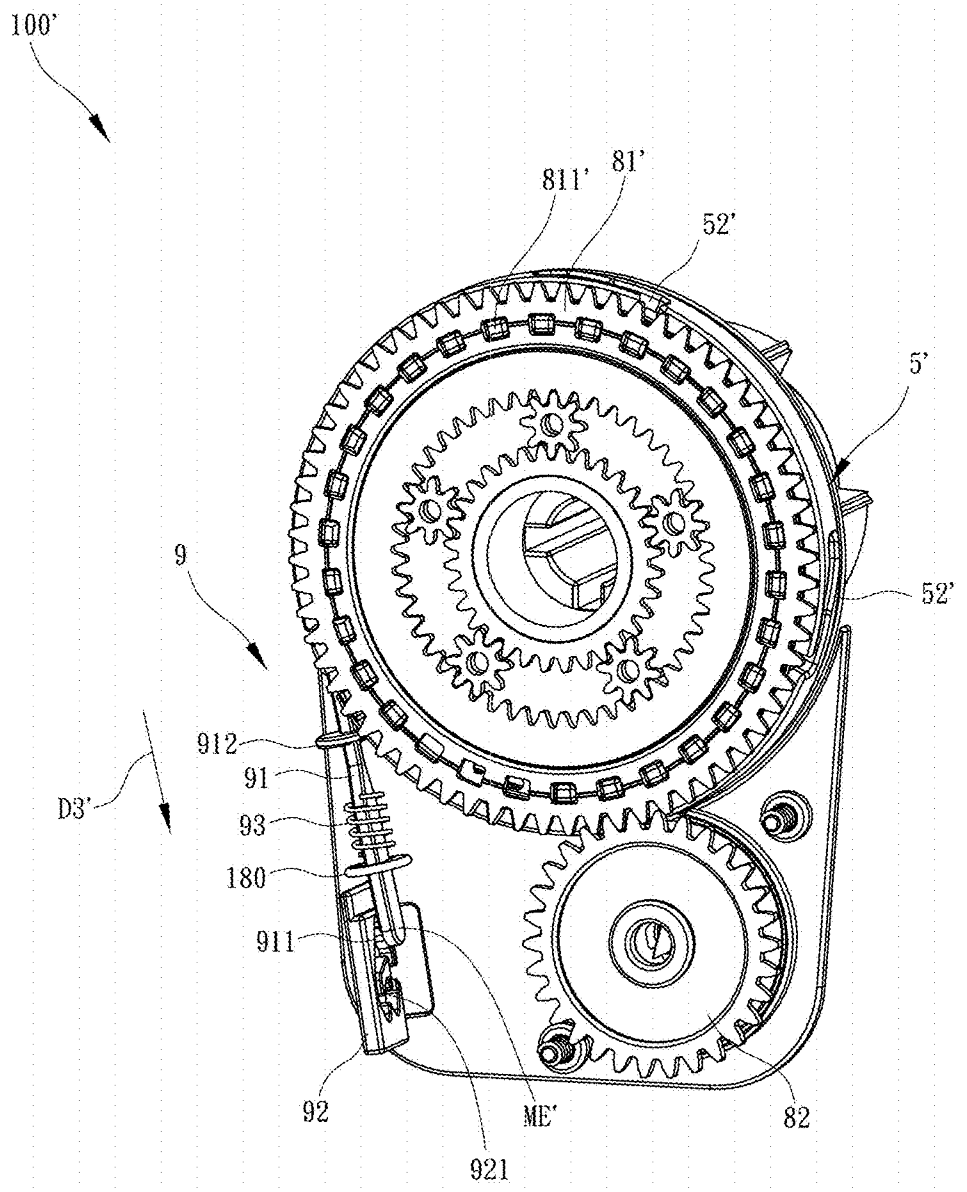
FIG. 22 is a perspective view of the window covering operation mechanism in FIG. 19 omitting the first shell, the first transmission member, and the second transmission member.
Figure 23:
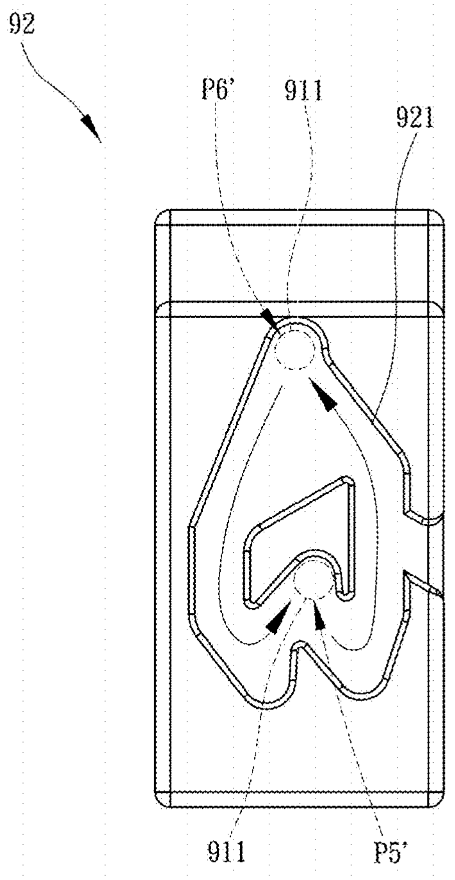
FIG. 23 is a schematic diagram illustrating the relative positions of the locking stick in FIG. 19 within the cycling groove of the grooved body.

Please refer to FIGS. 19, 22, and 23. In the present embodiment, the locking mechanism 9 of the window covering operation mechanism 100' comprises a moving member 91, a grooved body 92, and a restoring member 93. The moving member 91 has a connecting end CE' and a moving end ME' opposite thereto. When one end of the first transmission member (not shown) extending out from the base 1' is subjected to force and thereby drives the driving member 5' to rotate, the driving member 5' drives the moving member 91 to move, by which the moving end ME' of the moving member 91 roughly moves in a first direction D3'. The grooved body 92 is fixed on the grooved body fixing structure 113'. A surface of the grooved body 92 has a cycling groove 921 formed thereon.

Keep referring to FIGS. 19, 22, and 23. In the present embodiment, the moving member 91 comprises a locking stick 911 and a blocking flange 912. The locking stick 911 is disposed on a moving end ME' of the moving member 91, extending towards the grooved body 92 and extending into the cycling groove 921. The blocking flange 912 is adjacent to the connecting end CE' of the moving member 91. In this embodiment, an upper end of the grooved body fixing structure 113' is served as an obstructing structure at the same time. The restoring member 93 may be a spring, being disposed between the upper end of the grooved body fixing structure 113' and the bottom of the moving member 91 roughly in the first direction D3'. Preferably, there is a blocking ring 180 disposed between the upper end of the grooved body fixing structure 113' and the restoring member 93. One end of the restoring member 93 abuts against the blocking flange 912, while the other end of the restoring member 93 indirectly abuts against the upper end of the grooved body fixing structure 113' through the blocking ring 180. When the driving member 5' rotates and thereby drives the moving end ME' of the moving member 91 to move roughly in the first direction D3', the blocking flange 912 comes close to the blocking ring 180, causing the compression of the restoring member 93. Following that, once the driving member 5' stops exerting force on the moving member 91, the restoring member 93 applies an elastic force, which is opposite to the first direction D3', to the moving member 91. Thereby, the moving end ME' of the moving member 91 moves roughly in a direction opposite to the first direction D3' until the locking stick 911 is engaged with the cycling groove 921 at one of a forward position P5' and a reverse position P6'

Correspondingly, the driving member 5' is moved to and positioned at the third position P3' or the fourth position P4'. For instance, referring to FIG. 22 and FIG. 23, when the locking stick 911 is engaged with the cycling groove 921 on the grooved body 92 at the reverse position P6', the driving member 5' is correspondingly positioned at the fourth position P4', consequently leading to the driven member (not shown) being positioned at a specified position where the driven member is made to be connected to the input portion of the torsional direction switching mechanism. In that case, the driven member can output the reverse torsional force to the roller. By contrast, when the locking stick 911 is engaged with the cycling groove 921 on the grooved body 92 at the forward position P5', the driving member 5' is correspondingly positioned at the third position P3', consequently leading to the driven member (not shown) being positioned at another specified position where the driven member is made to be connected to the driving connector. In that case, the driven member can output the forward torsional force to the roller. In the present embodiment, the mode of the relative movement of the cycling groove 921 and the locking stick 911 is similar to that in the previous embodiment. However, in the previous embodiment, the locking stick is the one remaining in the stationary state while the moving member moves with respect to the locking stick. By contrast, in the present embodiment, the cycling groove 921 is the one remaining in the stationary state while the locking stick 911 moves within the cycling groove 921 with respect to the cycling groove 921.

Please refer back to FIGS. 1, 3, 4, and 15. When the window covering 200 is in the covering-retracting control mode, the user can repeatedly pull out the second shaft 63 of the control pull rod 6 with respect to the first shaft 62 to perform the retraction of the window covering 200. In a similar way, when the window covering 200 is in the covering-extending control mode, the user can repeatedly pull out the second shaft 63 of the control pull rod 6 with respect to the first shaft 62 to perform the extension of the window covering 200. In the process of repeatedly pulling out the second shaft 63 of the control pull rod 6, every time after the second shaft 63 has been pulled out by the user, the second shaft 63 retracts to an original position automatically. Such a function is implemented by the rewinding unit 8.

Referring to FIGS. 2, 3, 4, and 15, the rewinding unit 8 comprises an external toothed ring 81, a spring storage wheel 82, and a coil spring 83. The external toothed ring 81 comprises a second coupling structure 811. The second coupling structure 811 comprises plural through holes and plural protruding columns (see FIG. 4), in which the through holes are uniformly distributed in a circular pattern, and the protruding columns are distributed between each pair of the through holes. The first coupling structure 413 of the driven member 4 comprises plural latch columns, which pass through the through holes of the second coupling structure 811, respectively, and being slidable with respect to the corresponding through holes. Meanwhile, the protruding columns of the second coupling structure 811 extend into the space between each pair of the latch columns first of the first coupling structure 413. Thereby, the external toothed ring 81 is connected to the driven member 4 in a manner that the external toothed ring 81 can be driven by the driven member 4 to rotate but also is allowed to move with respect to the external toothed ring 81 along the axis A1. The spring storage wheel 82 is rotatably sleeved on the fixing post 114 of the first shell 11 and has an outer toothed rim. The external toothed ring 81 has plural teeth on its outer side in engagement with the outer toothed rim of the spring storage wheel 82, so that the spring storage wheel 82 and the external toothed ring 81 are connected in a manner that one of them can drive the other of them to rotate. The two ends of the coil spring 83 is fixed to the fixing post 114 of the first shell 11 of the base 1 and the spring storage wheel 82, respectively. Moreover, the coil spring 83 is generally wound around the fixing post 114. In response to the rotation of the spring storage wheel 82, the coil spring 83 is contracted or released according to different directions of the rotation of the spring storage wheel 82.

Please refer to FIGS. 3, 4, 10, and 15. When the second transmission member 160 is subjected to force and thereby drives the driven member 4 to rotate forwardly, the external toothed ring 81 is brought by the driven member 4 to rotate forwardly together, further driving the spring storage wheel 82 to rotate in an accumulating direction D4. At this point, the coil spring 83 is contracted and thereby accumulates a rewinding elastic force. After that, once the second transmission member 160 stops being subjected to force, the coil spring 83 is correspondingly released and exerts the rewinding elastic force on the spring storage wheel 82, triggering the spring storage wheel 82 to rotate in an energy-releasing direction opposite to the accumulating direction D4, which further drives the driven member 4 to rotate reversely through the external toothed ring 81. As the driven member 4 rotates reversely, the driven member 4 drives the second shaft 63 to move towards the first shaft 62 through the second transmission member 160, thereby implementing function of automatic retraction of the control pull rod 6.

Please refer to FIG. 15 together with FIG. 10. When the second shaft 63 moves towards the first shaft 62 under the effect of the rewinding elastic force provided by the coil spring 83, the motion route of the second shaft 63 has to be adequately restricted for preventing the first shaft 62 from overlapping with the second shaft 63, with the whole length or the most section of the first shaft 62. If the whole length of the first shaft 62 is overlapped with the second shaft 63, next time the first shaft 62 is pulled down by the user, the second shaft 63 will inevitably move downward together with the first shaft 62. In that case, the mode switching function and the covering retracting/extending function are both performed simultaneously, causing confusing operation experience for the user.

As shown in FIG. 10, in order to restrict the second shaft 63 from moving upward beyond a limit position, an elastic separator 65 is disposed within the first shaft 62. The elastic separator 65 has elasticity and a specified length decided in accordance with the elasticity and the limit position. In this embodiment, the elastic separator 65 is exemplified by a spring, with one end thereof abutting against a shaft limiting structure, i.e., the first end plug 621, and the other end abutting against an end surface of one end of the second shaft 63 that is nested on the first shaft 62. The configuration of the elastic separator 65 restricts the position of the second shaft 63 to be below the limit position. Therefore, the first shaft 62 remains comprising a non-overlapping section 622, which does not overlap with the second shaft 63 during all actions of the control pull rod 6. In other words, when the lift cord 160 (i.e., the second transmission member) stops being subjected to force and is rewound onto the circumference surface of the driven member 4 under the effect of the rewinding elastic force provided by the coil spring 83, the rewound lift cord 160 does not move the second shaft 63 upward to abut the first end plug 621 of the first shaft 62, thereby keeping the existence of the non-overlapping section 622. Additionally, a length of the non-overlapping section 622 is constantly larger than a length of the elastic separator 65 in a completely-compressed state.

Meanwhile, in the present embodiment, the length of the non-overlapping section 622 is generally equal to a length of the elastic separator 65. If the length of the elastic separator 65 changes, the length of the non-overlapping section 622 also changes along with the length of the elastic separator 65. Therefore, the user is constantly allowed to solely pull down the first shaft 62 for executing the mode switching function by operating the non-overlapping section 622 of the first shaft 62, avoiding erroneous operation in which the second shaft 63 is inadvertently moved along with the first shaft 62. In some other embodiments, the length of the non-overlapping section is larger than the length of the elastic separator. In a situation that the first shaft and the second shaft are not operated and presented in a naturally dangling, upright state, the bottom of the elastic separator abuts the end surface on the end of the second shaft that is nested on the first shaft, while the top end of the elastic separator does not contact with the shaft limiting structure of the first shaft (e.g., the first end plug). In doing so, a non-overlapping section is preserved to consistently avoid overlap with the second shaft, ensuring that the user does not inadvertently cause the second shaft to move downward simultaneously while pulling down the first shaft.

Referring to FIG. 10 and FIG. 15, when the first shaft 62 is pulled down and thereby drives the reversal cord 140 to move, the top end of the elastic separator 65 is slightly pressed down by the shaft limiting structure of the first shaft 62 (i.e., the first end plug 621). At this moment, the elastic separator 65 deforms and absorbs all downward pressures, resulting in the second shaft 63 remaining stationary with respect to the first shaft 62. Following that, once the first shaft 62 stops being subjected to force, the driving member 5 rotates reversely to a small degree and thereby rolls up the reversal cord 140 under the effect of the elastic force provided by the restoring member 73 of the locking mechanism 7. In the meantime, the elastic separator 65 releases the elasticity to push the shaft limiting structure (i.e., the first end plug 621), and the first shaft 62 is reset to the original position as being pulled upward by the reversal cord 140 and being pushed upward by that elasticity.

In another embodiment of the present disclosure, the second shaft is sleeved on an external peripheral surface of the first shaft. Furthermore, on the other end of the first shaft rather than the end where the second shaft is sleeved on, the first shaft has an outer flange radially extending from the external peripheral surface, while the elastic separator is a cylinder made of an elastic material and is sleeved on the first shaft, with its upper end abutting against the outer flange of the first shaft, and its lower end abutting against the end surface on one end of the second shaft sleeved on the first shaft. When the first shaft is pulled down, the top end of the elastic separator is slightly pressed down by the outer flange, so that the elastic separator absorbs all downward pressures and allows the second shaft to remain stationary with respect to the first shaft. After the first shaft stops being subjected to force, the elastic separator releases elasticity to the outer flange of the first shaft to reset the first shaft to the original position. On the other hand, after the second shaft has been pulled down and subsequently stops being subjected to force, the second shaft moves upward under the effect of the coil spring, pressing the bottom end of the elastic separator to an extent, and reaching a limit position. Thereby, the second shaft is prevented from overlapping with the whole length or the most section of the first shaft. During the above-mentioned actions, the first shaft utilizes the elastic separator to maintain the non-overlapping section of it, avoiding erroneous operation where different functions are executed simultaneously.

Figure 24:
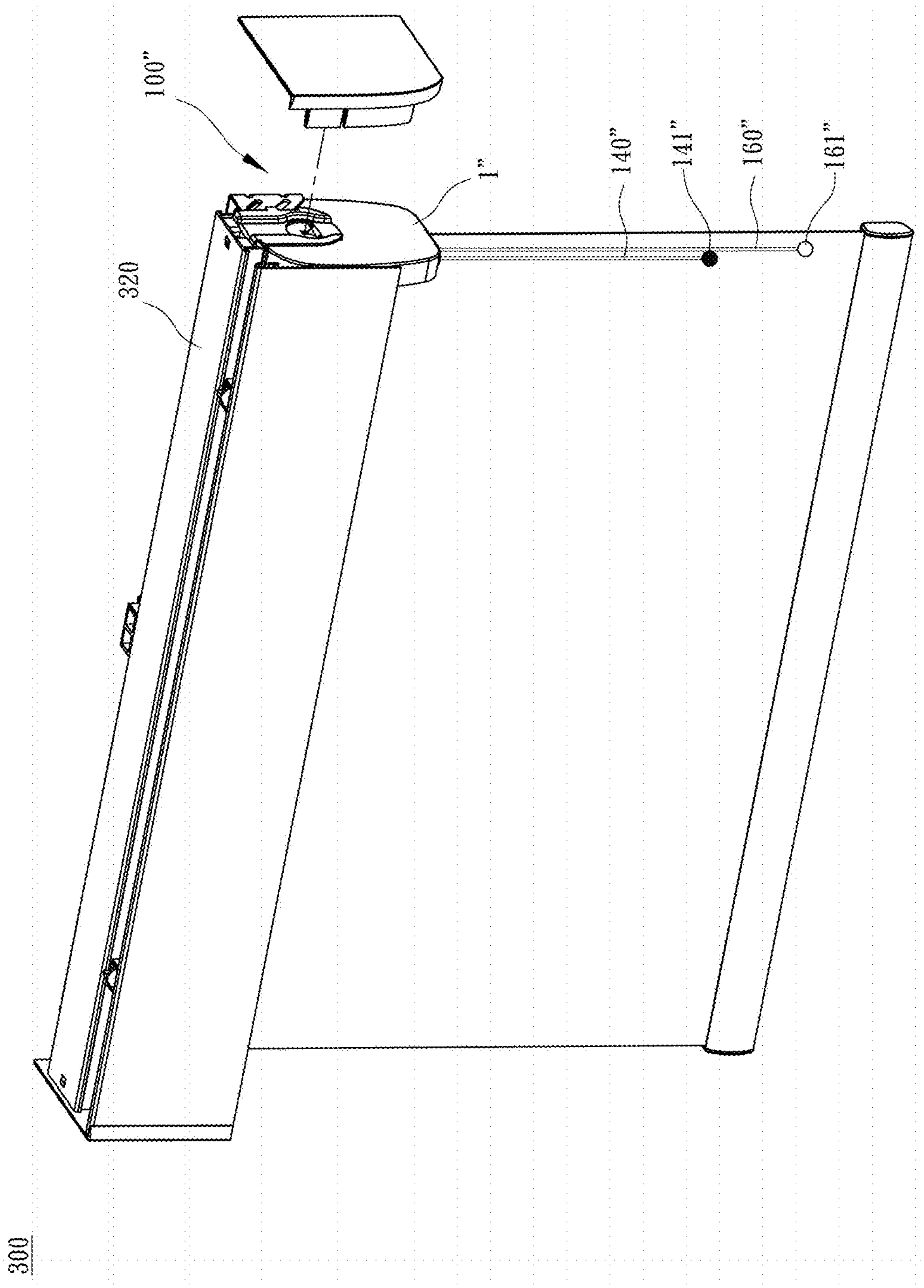
FIG. 24 is a partial exploded perspective view of a third embodiment of the window covering and the window covering operation mechanism thereof of the present disclosure.

Please refer to FIG. 24, which shows a third embodiment of the window covering and the window covering operation mechanism of the present disclosure. In the present embodiment, the window covering operation mechanism 100" differs from the window covering operation mechanism 100 in the first embodiment in that it does not include the control pull rod. The window covering operation mechanism 100" is applied to a window covering 300, which comprises a headrail 320. The first transmission member of the window covering operation mechanism 100" is exemplified by a reversal cord 140", one end of which is fixed to the driving member (not shown) within the base 1". The other end of the reversal cord 140" extends out from the base 1" and exposed to the exterior of the headrail 320, being provided to be directly dragged down by the user for driving the driven member (not shown) to rotate around an axial direction of the roller of the window covering 300.

For the convenience of user recognition and distinction, the distal ends of the reversal cord 140" and the lift cord 160", or the handle pieces 141" and 161" respectively connected thereto, can be produced with varying appearances, such as different colors, materials, or designs. The user can drag down the lift cord 160" to drive the driven member (not shown) to rotate, thereby outputting a torsional force in the forward or reverse direction to the roller of the window covering 300 according to the current control mode of the window covering 300. Meanwhile, the user can drag down the reversal cord 140" to drive the driving member (not shown) to rotate, thereby switching the control mode of the window covering 300 between a covering-retracting control mode and a covering-extending control mode. Since the window covering operation mechanism 100" in the present embodiment comprises two operating cords (i.e., the reversal cord 140" and the lift cord 160") for executing different functions individually, its operation is simpler to learn and less prone to errors, compared to the operation method of one single operating cord in which different functions are determined to be performed by dragging the operating cord at a specified angle. Moreover, the inconvenience of the window covering in the art, which is caused by the curtain controller installed on the headrail and difficult to touch, can be eliminated.

The window covering operation mechanisms 100, 100', 100" of the window coverings 200, 300 of the present disclosure utilize the first guiding structures (i.e., the guiding rails 13 and the bumps 112') of the bases 1, 1', 1" to collaborate with the second guiding structures (i.e., the bumps 52 and the guiding rails 52') of the driving members 5, 5', making the driving members 5, 5' move along the axial direction of the rollers 240 of the window coverings 200, 300 simultaneously when the driving members 5, 5' are forced to rotate, which further drives the driven members 4 to move between two specified positions, which correspond to the covering-retracting control mode and the covering-extending control mode, respectively. Meanwhile, the design of the annular bodies 51, 51' of the driving members 5, 5' surrounding the driven members 4 eliminates the sizes of the window covering operation mechanisms 100, 100', 100". Additionally, the window covering operation mechanisms 100, 100', 100" of the present disclosure comprise the first transmission members and the second transmission members for controlling the rotation of the driving members 5, 5' and the driven member 4 respectively, which extend out from the headrails 220, 320 of the window coverings 200, 300 to be close to the user, having advantages of providing convenience for user operation and separating two different operations of mode-switching and covering-lifting to avoid confusing. Furthermore, the window covering operation mechanisms 100,100',100" of the window coverings 200, 300 of the present disclosure can each have a control pull rod 6 to wrap the first transmission cord and the second transmission cord inside, thereby preventing children from accidental risks and complying with relevant international safety regulations for curtain manufacturing.

The embodiments described above are only some exemplary embodiments of the present disclosure. All equivalent structures which employ the concepts disclosed in this specification and the appended claims should fall within the scope of the present disclosure.

What is claimed is:

1. A window covering operation mechanism applied to a window covering with a roller for controlling the window covering to retract or extend, comprising:

a driving connector, fixedly connected to an end of the roller so that the roller is configured to be concurrently rotatable with the driving connector;

a base, comprising plural first guiding structures;

a torsional direction switching mechanism, comprising:

an input portion; and an output portion, connected to the driving connector so that the driving connector is configured to be concurrently rotatable with the output portion, wherein when the input portion is driven to rotate, the output portion rotates in a direction opposite to the input portion of the torsional direction switching mechanism, and drives the driving connector to rotate in a same direction as the output portion;

a driven member, disposed in the base and rotatable around an axial direction of the roller;

a driving member, comprising:

an annular body, disposed around the driven member, and connected to the driven member in the axial direction of the roller so that the driven member is configured to be concurrently movable with the driving member along the axial direction of the roller, wherein the annular body and the driven member are rotatable with respect to each other around the axial direction of the roller when being subjected to force individually; and plural second guiding structures, formed on an outer peripheral surface of the annular body and engaged with the first guiding structures respectively, wherein each of the second guiding structures is movable between a first position and a second position with respect to a corresponding one of the first guiding structures in response to rotation of the annular body, wherein the second position is farther away from the roller than the first position; when the driving member rotates to make each of the second guiding structures move from the first position to the second position with respect to the corresponding first guiding structure, the driving member is concurrently guided to move along the axial direction of the roller from a third position to a fourth position and causes the driven member to move and to be connected to the input portion of the torsional direction switching mechanism, wherein the fourth position is farther away from the roller than the third position; when the driving member rotates to make each of the second guiding structures move from the second position to the first position with respect to the corresponding first guiding structure, the driving member is concurrently guided to move from the fourth position to the third position along the axial direction of the roller and causes the driven member to move and to be connected to the driving connector;

a first transmission member, having one end connected to the driving member and another end extending out from the base for driving the driving member to rotate when being subjected to force; and a second transmission member, having one end connected to the driven member and another end extending out from the base for driving the driven member to rotate when being subjected to force;

wherein when the another end of the first transmission member extending out from the base is subjected to force and thereby drives the driving member to rotate, each of the second guiding structures of the driving member is moved from one of the first position and the second position to the other one of the first position and the second position with respect to the corresponding one of the first guiding structures, and the driving member is guided to move along the axial direction of the roller concurrently;

wherein when the another end of the second transmission member extending out from the base is subjected to force and thereby drives the driven member to rotate as the driving member is located at the third position, the driven member drives the driving connector connected thereto to rotate, thereby outputting a forward torsional force to the roller; when the another end of the second transmission member extending out from the base is subjected to force and thereby drives the driven member to rotate as the driving member is located at the fourth position, the driven member drives the input portion of the torsional direction switching mechanism connected thereto to rotate, such that the output portion of the torsional direction switching mechanism outputs a reverse torsional force to the roller through the driving connector.

2. The window covering operation mechanism of claim 1, further comprising a locking mechanism disposed in the base for positioning the driving member at one of the third position and the fourth position, wherein the locking mechanism comprises:

a moving member, having a connecting end and a moving end opposite to the connecting end, wherein the connecting end of the moving member is connected to the driving member, and the moving end of the moving member has a cycling groove formed thereon; when the another end of the first transmission member extending out from the base is subjected to force and thereby drives the driving member to rotate, the driving member drives the moving member to move, thereby making the moving end of the moving member move in a first direction;

a locking stick, having one end fixed on the base and another end extending into the cycling groove; and a restoring member, disposed between an obstructing structure of the base and the moving member for providing the moving member with an elastic force in a direction opposite to the first direction;

wherein after the another end of the first transmission member extending out from the base has been subjected to force to drive the driving member to rotate and subsequently stops being subjected to force, the moving end of the moving member moves in the direction opposite to the first direction in response to the elastic force acting on the moving member, whereby a relative movement of the locking stick with respect to the cycling groove occurs; wherein the moving end of the moving member moves until the cycling groove is blocked by the locking stick, after which the moving member is in a stationary state and the locking stick is positioned at one of a forward position and a reverse position within the cycling groove; wherein when the locking stick is positioned at the forward position, the driving member is positioned at the third position; when the locking stick is positioned at the reverse position, the driving member is positioned at the fourth position.

3. The window covering operation mechanism of claim 2, wherein a bottom of the cycling groove has two stepped structures; in a direction of the relative movement of the locking stick with respect to the cycling groove, the two stepped structures change in height from shallow to deep, and are located in a path in the cycling groove directed from the forward position to the reverse position and a path in the cycling groove directed from the reverse position to the forward position, respectively.

4. The window covering operation mechanism of claim 2, wherein the outer peripheral surface of the annular body of the driving member has a toothed portion, and the moving member comprises a rack; the connecting end of the moving member is located on the rack and connected to the toothed portion in an engaging manner.

5. The window covering operation mechanism of claim 1, further comprising a locking mechanism disposed in the base for positioning the driving member at one of the third position and the fourth position, wherein the locking mechanism comprises:

a moving member, having a connecting end and a moving end opposite to the connecting end, wherein the connecting end is connected to the driving member; when the another end of the first transmission member extending out from the base is subjected to force and thereby drives the driving member to rotate, the driving member drives the moving member to move, whereby the moving end of the moving member moves in a first direction;

a grooved body, fixed in the base and having a cycling groove formed thereon;

a locking stick, disposed on the moving end of the moving member, extending towards the grooved body and extending into the cycling groove; and a restoring member, disposed between an obstructing structure of the base and the moving member for providing the moving member with an elastic force in a direction opposite to the first direction;

wherein after the another end of the first transmission member extending out from the base has been subjected to force to drive the driving member to rotate and subsequently stops being subjected to force, the moving end of the moving member moves in the direction opposite to the first direction in response to the elastic force acting on the moving member, whereby a relative movement of the locking stick with respect to the cycling groove occurs; wherein the moving end of the moving member moves until the locking stick is blocked by the cycling groove, after which the moving member is in a stationary state and the locking stick is positioned at one of a forward position and a reverse position within the cycling groove; wherein when the locking stick is positioned at the forward position, the driving member is positioned at the third position; when the locking stick is positioned at the reverse position, the driving member is positioned at the fourth position.

6. The window covering operation mechanism of claim 5, wherein a bottom of the cycling groove has two stepped structures; in a direction of the relative movement of the locking stick with respect to the cycling groove, the two stepped structures change in height from shallow to deep, and located in a path in the cycling groove directed from the forward position to the reverse position and a path in the cycling groove directed from the reverse position to the forward position, respectively.

7. The window covering operation mechanism of claim 5, wherein the outer peripheral surface of the annular body of the driving member has a toothed portion, and the moving member comprises a rack; the connecting end of the moving member is located on the rack and connected to the toothed portion in an engaging manner.

8. The window covering operation mechanism of claim 5, wherein the moving member comprises a blocking flange located between the connecting end and the moving end of the moving member, and the restoring member is disposed between the obstructing structure of the base and the blocking flange of the moving member; when the moving end of the moving member moves in the first direction, a distance between the blocking flange and the obstructing structure is changed, such that the restoring member undergoes elastic deformation.

9. The window covering operation mechanism of claim 1, further comprising a control pull rod, wherein the control pull rod comprises:

a fixed shaft, having a first end connected to the base and a second end opposite to the first end;

a first shaft, nested on the second end of the fixed shaft and retractable along an axial direction of the control pull rod with respect to the fixed shaft, wherein the another end of the first transmission member extending out from the base extends into the control pull rod and is fixed to the first shaft; and a second shaft, nested on the first shaft and retractable along the axial direction of the control pull rod with respect to the first shaft, wherein the another end of the second transmission member extending out from the base extends into the control pull rod and is fixed to the second shaft;

wherein when the first shaft is protruded with respect to the fixed shaft, the first shaft drives the driving member to rotate through the first transmission member; when the second shaft is protruded with respect to the first shaft, the second shaft drives the driven member to rotate through the second transmission member.

10. The window covering operation mechanism of claim 9, wherein the control pull rod further comprises an elastic separator abutting between a shaft limiting structure of the first shaft and an end surface on an end of the second shaft that is nested on the first shaft, and the elastic separator ensures the first shaft having a non-overlapping section which does not overlap with the second shaft; a length of the non-overlapping section of the first shaft is longer than a length of the elastic separator while the elastic separator is completely compressed.

11. The window covering operation mechanism of claim 1, wherein each of the first guiding structures is one of a guiding rail and a bump, and each of the second guiding structures is another one of the guiding rail and the bump.

12. The window covering operation mechanism of claim 1, wherein the torsional direction switching mechanism comprises:

a central gear, rotatably disposed in the base around the axial direction of the roller and comprising an axial portion, wherein the output portion of the torsional direction switching mechanism is located on one end of the axial portion;

plural peripheral gears, disposed in the base with plural posts of the base passing through the peripheral gears respectively, wherein each of the posts has a longitudinal axis parallel to the axial direction of the roller, and each of the peripheral gears is rotatable around the post passing therethrough; the peripheral gears are arranged in an annular manner around the central gear with each of the peripheral gears engaged with the central gear; and an annular member, being annular-shaped and having an inner side formed with plural teeth, the annular member surrounding the peripheral gears and the central gear, wherein the plural teeth on the inner side of the annular member are engaged with the peripheral gears, and the input portion of the torsional direction switching mechanism is located on one side of the annular member facing the driven member.

13. The window covering operation mechanism of claim 1, further comprising:

an external toothed ring, connected to the driven member in a concurrently rotatable manner, wherein the driven member is movable with respect to the external toothed ring along the axial direction of the roller;

a spring storage wheel, rotatably sleeved on a fixing post of the base and connected to the external toothed ring; and a coil spring, having one end fixed to the fixing post of the base and another end fixed to the spring storage wheel; the coil spring being generally wound around the fixing post of the base, wherein when the spring storage wheel rotates with respect to the fixing post, the coil spring is contracted or released correspondingly to different rotating directions of the spring storage wheel;

wherein when the second transmission member is subjected to force and thereby drives the driven member to rotate, the external toothed ring is driven by the driven member to rotate concurrently and thereby drives the spring storage wheel to rotate in an accumulating direction, gradually releasing the coil spring, at which point if the second transmission member stops being subjected to force, the spring storage wheel rotates in an energy-releasing direction opposite to the accumulating direction in response to a rewinding elastic force provided by the coil spring, thereby driving the driven member to rotate reversely through the external toothed ring and gradually contracting the coil spring on the spring storage wheel;

wherein when the driving member is located at the third position and the driven member rotates reversely, the driven member does not drive the driving connector connected thereto to rotate; when the driving member is located at the fourth position and the driven member rotates reversely, the driven member does not drive the input portion of the torsional direction switching mechanism connected thereto to rotate.

14. The window covering operation mechanism of claim 1, wherein the second transmission member is a lift cord, and the driven member comprises a main body and an annular groove formed on an outer peripheral edge of the main body; the lift cord has an end fixed to the driven member, so that the lift cord is configured to be wound up within the annular groove and unwound from the annular groove while the driven member rotates; an inner side of the annular body of the driving member has plural hooks, and the hooks are engaged with the annular groove of the driven member in the axial direction of the roller and are slidable circumferentially in the annular groove, such that the driving member and the driven member are rotatable with respect to each other around the axial direction of the roller when being subjected to force individually.

15. The window covering operation mechanism of claim 1, wherein the first transmission member is a reversal cord, having an end fixed to the driving member and another end extending out from the base for driving the driving member to rotate when being subjected to force.

16. A window covering, comprising: a roller; and the window covering operation mechanism as defined in claim 1.

17. The window covering of claim 16, wherein the window covering operation mechanism further comprises a locking mechanism disposed in the base for positioning the driving member at one of the third position and the fourth position, and the locking mechanism comprises:

a moving member, having a connecting end and a moving end opposite to the connecting end, wherein the connecting end of the moving member is connected to the driving member, and the moving end of the moving member has a cycling groove formed thereon; when the another end of the first transmission member extending out from the base is subjected to force and thereby drives the driving member to rotate, the driving member drives the moving member to move, thereby making the moving end of the moving member move in a first direction;

a locking stick, having one end fixed on the base and another end extending into the cycling groove; and a restoring member, disposed between an obstructing structure of the base and the moving member for providing the moving member with an elastic force in a direction opposite to the first direction;

wherein after the another end of the first transmission member extending out from the base has been subjected to force to drive the driving member to rotate and subsequently stops being subjected to force, the moving end of the moving member moves in the direction opposite to the first direction in response to the elastic force acting on the moving member, whereby a relative movement of the locking stick with respect to the cycling groove occurs; wherein the moving end of the moving member moves until the cycling groove is blocked by the locking stick, after which the moving member is in a stationary state and the locking stick is positioned at one of a forward position and a reverse position within the cycling groove; wherein when the locking stick is positioned at the forward position, the driving member is positioned at the third position; when the locking stick is positioned at the reverse position, the driving member is positioned at the fourth position.

18. The window covering of claim 16, wherein the window covering operation mechanism further comprises a locking mechanism disposed in the base for positioning the driving member at one of the third position and the fourth position, wherein the locking mechanism comprises:

a moving member, having a connecting end and a moving end opposite to the connecting end, wherein the connecting end is connected to the driving member; when the another end of the first transmission member extending out from the base is subjected to force and thereby drives the driving member to rotate, the driving member drives the moving member to move, wherein the moving end of the moving member moves in a first direction;

a grooved body, fixed in the base and having a cycling groove formed thereon;

a locking stick, disposed on the moving end of the moving member, extending towards the grooved body and extending into the cycling groove; and a restoring member, disposed between an obstructing structure of the base and the moving member for providing the moving member with an elastic force in a direction opposite to the first direction;

wherein after the another end of the first transmission member extending out from the base has been subjected to force to drive the driving member to rotate and subsequently stops being subjected to force, the moving end of the moving member moves in the direction opposite to the first direction in response to the elastic force acting on the moving member, whereby a relative movement of the locking stick with respect to the cycling groove occurs; wherein the moving end of the moving member moves until the locking stick is blocked by the cycling groove, after which the moving member is in a stationary state and the locking stick is positioned at one of a forward position and a reverse position within the cycling groove; wherein when the locking stick is positioned at the forward position, the driving member is positioned at the third position; when the locking stick is positioned at the reverse position, the driving member is positioned at the fourth position.

19. The window covering of claim 16, wherein the window covering further comprises a control pull rod, wherein the control pull rod comprises:

a fixed shaft, having a first end connected to the base and a second end opposite to the first end;

a first shaft, nested on the second end of the fixed shaft and retractable along an axial direction of the control pull rod with respect to the fixed shaft, wherein the another end of the first transmission member extending out from the base extends into the control pull rod and is fixed to the first shaft; and a second shaft, nested on the first shaft and retractable along the axial direction of the control pull rod with respect to the first shaft, wherein the another end of the second transmission member extending out from the base extends into the control pull rod and is fixed to the second shaft;

wherein when the first shaft is protruded with respect to the fixed shaft, the first shaft drives the driving member to rotate through the first transmission member; when the second shaft is protruded with respect to the first shaft, the second shaft drives the driven member to rotate through the second transmission member.

* * * * *